(12) United States Patent
Sasaki

(10) Patent No.: US 7,885,984 B2
(45) Date of Patent: Feb. 8, 2011

(54) EDITING DEVICE AND METHOD, PROGRAM, AND RECORDING MEDIUM

(75) Inventor: Yukiko Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 823 days.

(21) Appl. No.: 11/654,293

(22) Filed: Jan. 17, 2007

(65) Prior Publication Data
US 2007/0201816 A1    Aug. 30, 2007

(30) Foreign Application Priority Data
Jan. 19, 2006    (JP)    ............................... 2006-010720

(51) Int. Cl.
*G06F 17/30*    (2006.01)
(52) U.S. Cl. ...................... 707/803; 707/634
(58) Field of Classification Search ................ 707/102, 707/104.1, 200–204; 711/161–162, 173
See application file for complete search history.

(56) References Cited

U.S. PATENT DOCUMENTS

| | | | |
|---|---|---|---|
| 5,897,640 A * | 4/1999 | Veghte et al. ........................ 1/1 |
| 6,510,279 B1 * | 1/2003 | Morishita ..................... 386/96 |
| 7,123,813 B2 | 10/2006 | Inoue | |
| 7,136,882 B2 * | 11/2006 | Collins et al. ................ 707/204 |
| 2002/0181368 A1 * | 12/2002 | Chang et al. ............. 369/53.21 |
| 2005/0246642 A1 * | 11/2005 | Valderas et al. ............. 715/730 |
| 2005/0289235 A1 * | 12/2005 | Suematsu et al. ........... 709/230 |
| 2007/0035764 A1 * | 2/2007 | Aldrich et al. ............. 358/1.15 |
| 2008/0098320 A1 * | 4/2008 | Geier et al. .................. 715/769 |

FOREIGN PATENT DOCUMENTS

JP        2001-306367        11/2001

* cited by examiner

*Primary Examiner*—Debbie Le
(74) *Attorney, Agent, or Firm*—Frommer Lawrence & Haug LLP; William S. Frommer; Thomas F. Presson

(57) ABSTRACT

An editing device that replicates and edits data. The device includes a replication destination information display controlling unit that displays files and directories of a recording medium as a replication destination of the data in the figure on a display unit. A user can intuitively know data amounts of the files and directories of the recording medium as well as an available capacity of the recording medium as replication destination information. A replication unit executes planned replication and edition on the basis of the replication destination information displayed by the replication destination information display controlling unit.

10 Claims, 28 Drawing Sheets

EDITING DEVICE AND METHOD, PROGRAM, AND RECORDING MEDIUM

CROSS REFERENCES TO RELATED APPLICATIONS

The present invention contains subject matter related to Japanese Patent Application JP 2006-010720 filed in the Japanese Patent Office on Jan. 19, 2006, the entire contents of which being incorporated herein by reference.

BACKGROUND OF THE INVENTION

1. Field of the Invention

The present invention relates to an editing device and method, a program, and a recording medium, and more particularly, to an editing device and method, a program, and a recording medium which can permit easily confirming data amount at the time of replicating data.

2. Description of Related Art

In a related-art personal computer, a user inputs passwords of a recording medium and a file to be copied on a CUI (Character-based User Interface) or indicates a copy source and a copy destination by dragging and dropping a file icon disposed, for example, in a tree shape on a GUI (Graphical User Interface), when replicating (copying) the file.

For example, in a copy tool which is an application supporting a replication work of the file or a file management tool which displays a directory structure of the files has a function of illustrating with a bar graph or a circular graph so that the user can intuitively know a total capacity or an available capacity of the recording medium, and the data amount of the file.

For example, JP-A-2001-306367 discloses a personal computer capable of displaying a data capacity or the number of data files for each data attribute by simply operating the data of the recording medium.

SUMMARY OF THE INVENTION

However, in the method described above, the user cannot intuitively know data amount under a directory of a replication destination or a replication destination at the time of replicating data. Accordingly, when replicating the directory, the user cannot easily calculate an available capacity required for the replication by confirming the data amount to be replicated. There is a possibility that a failure in replication may occur due to space shortage or many working hours may be required due to a cumbersome verification work.

In view of the above circumstances, it is desirable to make the user be able to confirm the data amount with greater ease at the time of replicating the data, thereby making it possible to improve a convenience in replication work.

According to an embodiment of the invention, there is provided an editing device for replicating and editing data including a replication destination information display controlling unit displaying files and directories of a recording medium as a replication destination of the data in the figure on a display unit so that a user can intuitively know data amounts of the files and directories of the recording medium and an available capacity of the recording medium as replication destination information; and a replication unit executing planned replication and edition on the basis of the replication destination information displayed by the replication destination information display controlling unit.

The replication destination information display controlling unit displays the replication destination information in the form of a bar graph expressing data amounts of the files, the directories, and the available capacity in length on the display unit.

The editing device may further include a data amount calculating unit calculating the data amounts of the directories by calculating the sum of the data amounts of the files under the directories.

The editing device may further include a child window preparing unit preparing a child window for displaying directories and the files under the directories displayed by the replication destination information display controlling unit in the figure so that the user can intuitively know the data amount and displaying the child window on the display unit.

The editing device may further include a directory structure information preparing unit preparing directory structure information displaying a relationship between the child window prepared and displayed by the child window preparing unit and a directory corresponding to the child window and displaying the directory structure information on the display unit.

The editing device may further include a related file relationship information preparing unit preparing related file relationship information displaying a relationship the file displayed by the replication destination information display controlling unit and a file related to the file and displaying the related file relationship information on the display unit.

The editing device may further include an input receiving unit receiving a replication and edition command input inputted by the user's dragging and dropping an icon or a figure of a file or a directory to be replicated to the replication destination information displayed by the replication destination information display controlling unit, wherein the replication destination information display controlling unit displays the dragged and dropped file or directory to be replicated in the figure on the display unit so that the user can intuitively know the data amount in the replication and command input received by the input receiving unit.

The editing device may further include a replication source information display controlling unit displaying in the figure the data amounts of the files and the directories of a recording medium as the data replication source and an available capacity of the recording medium on the display unit so that the user can intuitively know the data amounts as the replication source information.

According to another embodiment of the invention, there is provided an editing method of editing device of replicating editing data including the steps of displaying in the figure the file and the directory of the recording medium as the replication destination of the data on a display unit so that the user can intuitively know the data amounts of the files and the directories and the available capacity of the recording medium as the replication destination; and executing planned replication and edition on the basis of the replication destination information displayed on the display unit.

According to further another embodiment of the invention, there is provided a program making a computer execute data replication edition processes including the steps of displaying in the figure the file and the directory of the recording medium as the replication destination of the data on a display unit so that the user can intuitively know the data amounts of the files and the directories and the available capacity of the recording medium as the replication destination; and executing planned replication and edition on the basis of the replication destination information displayed on the display unit.

According to still another embodiment of the invention, the program is recorded in the recording medium.

In the embodiments of the invention, the files and directories of the recording medium as the replication destination of the data are expressed in the figure so that the user can intuitively know the data amounts of the files and the directories of the recording medium and an available capacity of the recording medium as the replication destination information. Replication and edition planned on the basis of the displayed replication destination information are executed.

It is possible to replicate the information, and more particularly, it is possible to improve the convenience in replication work.

DETAILED DESCRIPTION OF THE INVENTION

Hereinafter, embodiments of the invention will be described. Correspondence between constituent requirements of the invention and embodiments described in DETIALED DESCRIPTION OF THE INVENTION are exemplified as follows. The following description is made to confirm that the embodiments supporting the invention are described in DETAILED DESCRIPTION OF THE INVENTION. Accordingly, there exists an embodiment which is described in DETAILED DESCRIPTION OF THE INVENTION, but not described herein as an embodiment of corresponding to the constituent requirements, it does not mean that the embodiment does not correspond to the constituent requirements. On the contrary, even when an embodiment corresponding to the constituent requirements is described therein, it does not mean that the embodiment does not correspond to constituent requirements other than the constituent requirements.

The description does not mean the entirety of the invention described in the specification. That is to say, the description does not negate the existence of the invention described in the specification and is not claimed in this application, that is, the existence of the invention which is divisionally applied is added by modification in the future.

The editing device according to an embodiment of the invention is an editing device (for example, an editing device shown in FIG. 1) for replicating and editing data. The editing device includes a replication destination information display controlling unit (for example, a GUI screen processing unit shown in FIG. 1, which displays file and directory information in a replication destination information display unit shown in FIG. 2 by processing Step S7 shown in FIG. 3) displaying files and directories of a recording medium (for example, a replication destination recording medium) as a replication destination of the data in the figure on a display unit so that a user can intuitively know data amounts of the files and directories of the recording medium and an available capacity of the recording medium as replication destination information; and a replication unit (for example, a replication executing unit shown in FIG. 1) for executing planned replication and edition on the basis of replication destination information displayed by the replication destination information display controlling unit.

Figure 2:
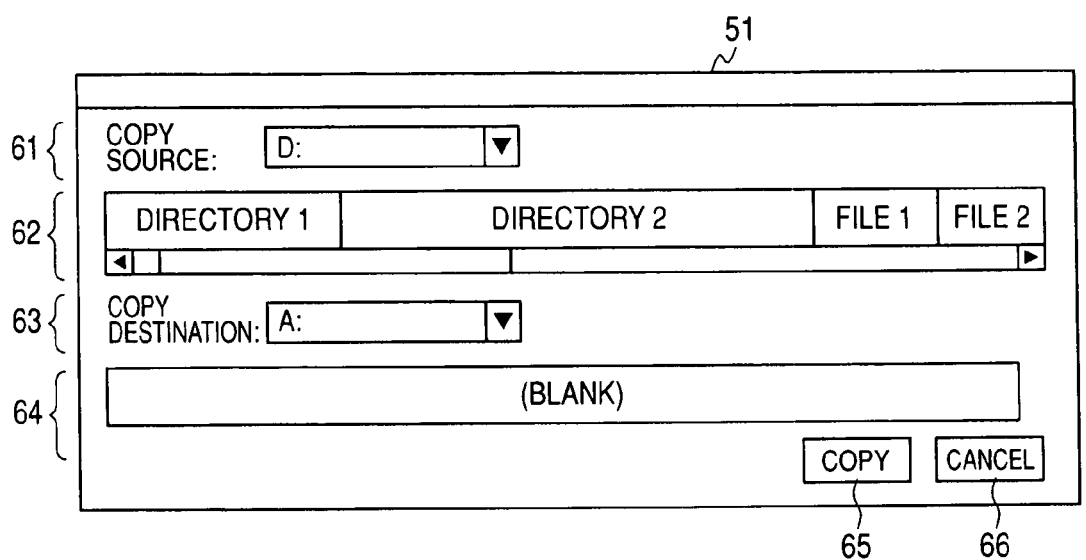
FIG. 2 is a view illustrating a display example of a replication and edition screen.

The replication destination information display controlling unit permits the replication destination information (for example, a replication destination information expressed in the replication destination information display unit shown in FIG. 2) to be expressed in the form of a bar graph expressing the data amounts of the file, the directory, and the available capacity in length.

Figure 4:
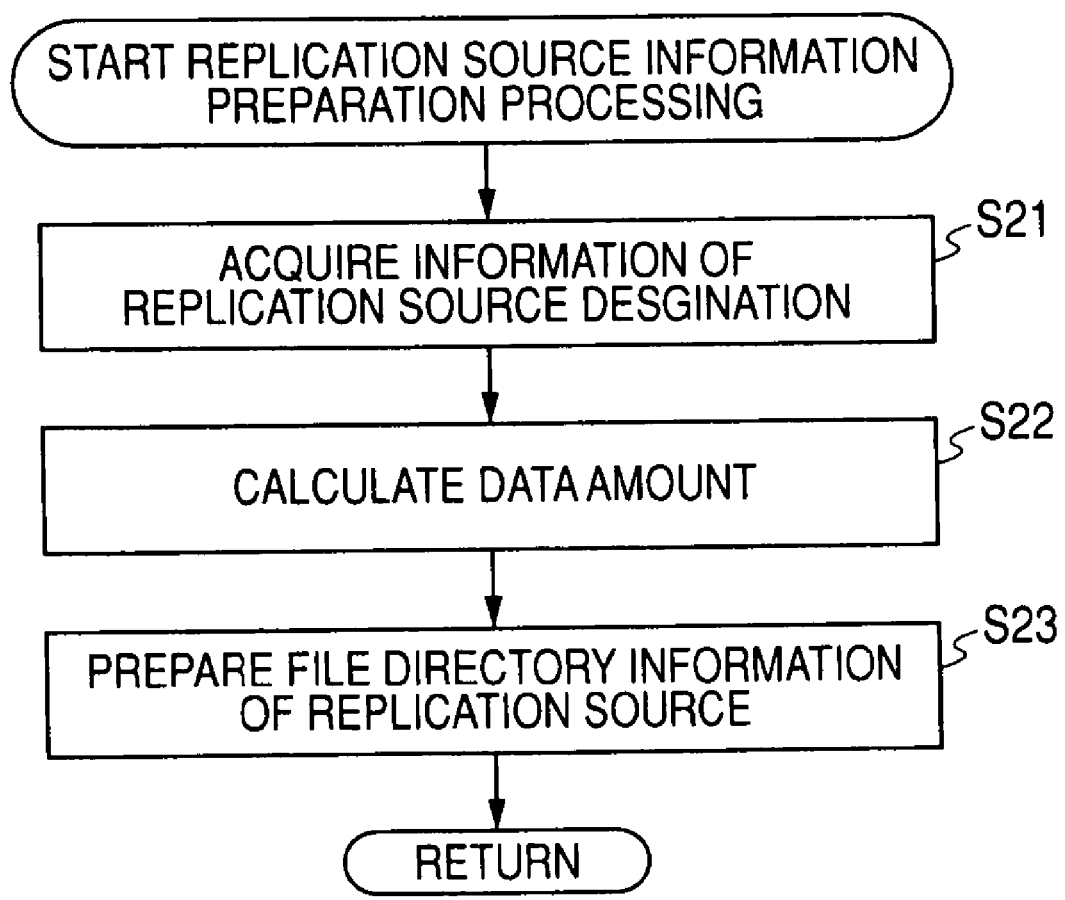
FIG. 4 is a flowchart illustrating an example of a replication source information preparation process flow.

The editing device according to another embodiment of the invention further includes a data amount calculating unit (for example, a file directory information processing unit for executing a process of Step S22 shown in FIG. 4) for calculating the data amount of the directory by calculating the sum of the data amounts of the files under the directories.

The editing device according to another embodiment of the invention further includes a child window preparing unit (for example, a GUI screen processing unit shown in FIG. 1, which executes a process of Step S43 shown in FIG. 8) for preparing the child window (for example, a child window shown in FIG. 7) for displaying the directories and the files under the directories displayed by the replication destination information display controlling unit and the directory in the figure so that the user can intuitively know the data amount and displaying the child window on the display unit.

The editing device according to another embodiment of the invention further includes a directory structure information preparing unit (for example, a directory structure processing unit shown in FIG. 1, which executes a process of Step S45 shown in FIG. 8) for displaying directory structure information on the display unit by preparing the displaying directory structure information (for example, a directory structure information shown in FIG. 7) displaying a relationship between the chilled window prepared and displayed by the child window preparing unit and a parent directory corresponding to the child window.

Figure 11A:
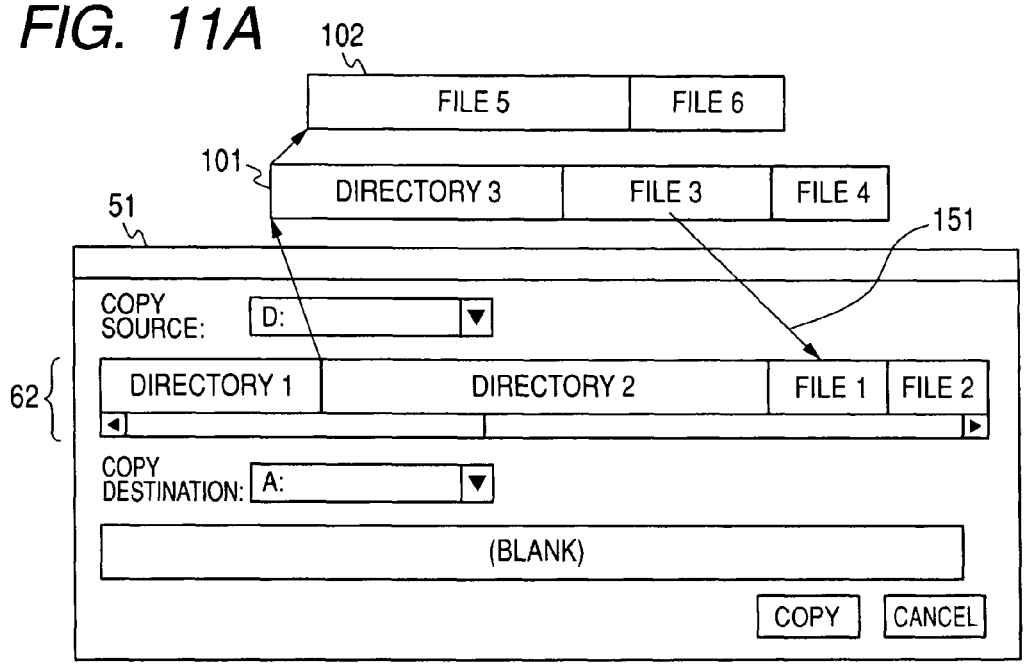
FIG. 11 is a view illustrating a display example of related file relationship information.
Figure 11B:
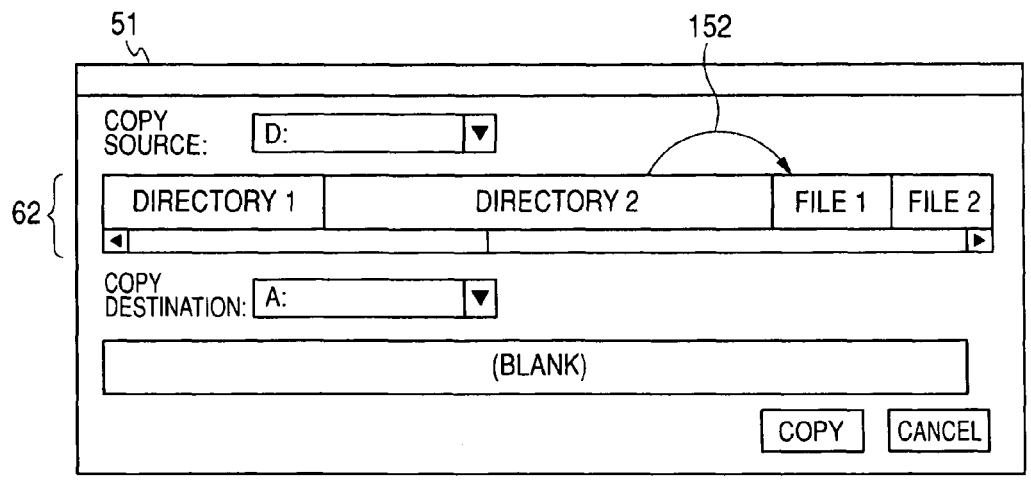

The editing device according to another embodiment of the invention further includes a related file relationship information preparing unit (for example, a related file processing unit shown in FIG. 1, which executes a process of Step S63 shown in FIG. 12) for displaying related file relationship information on the display unit by preparing the related file relationship information (for example, a related file relationship information shown in FIG. 11) displaying a relationship between the file displayed by the replication destination information display controlling unit and a file related to the file.

The editing device according to another embodiment of the invention further includes an input receiving unit (for example, an input receiving unit shown in FIG. 1) for receiving a replication and edition command input inputted by the user's dragging and dropping an icon or a figure of a file or a directory to be replicated to the replication destination information displayed by the replication destination information display controlling unit. The replication destination information display controlling unit shows the dragged and dropped file or directory to be replicated in the figure so that the user can intuitively know the data amount (for example, Step S89 shown in FIG. 16).

The editing device according to another embodiment of the invention further includes a replication source information display controlling unit (for example, the GUI screen processing unit shown in FIG. 1, which permits the file directory information to be displayed on a replication source information display unit shown in FIG. 2 by performing a process of Step S4 shown in FIG. 3) for displaying in the figure the data amounts of the file and the directory of a recording medium which are set as the data replication source and an available capacity of the recording medium on the display unit so that the user can intuitively know the data amounts as the replication source information.

Figure 1:
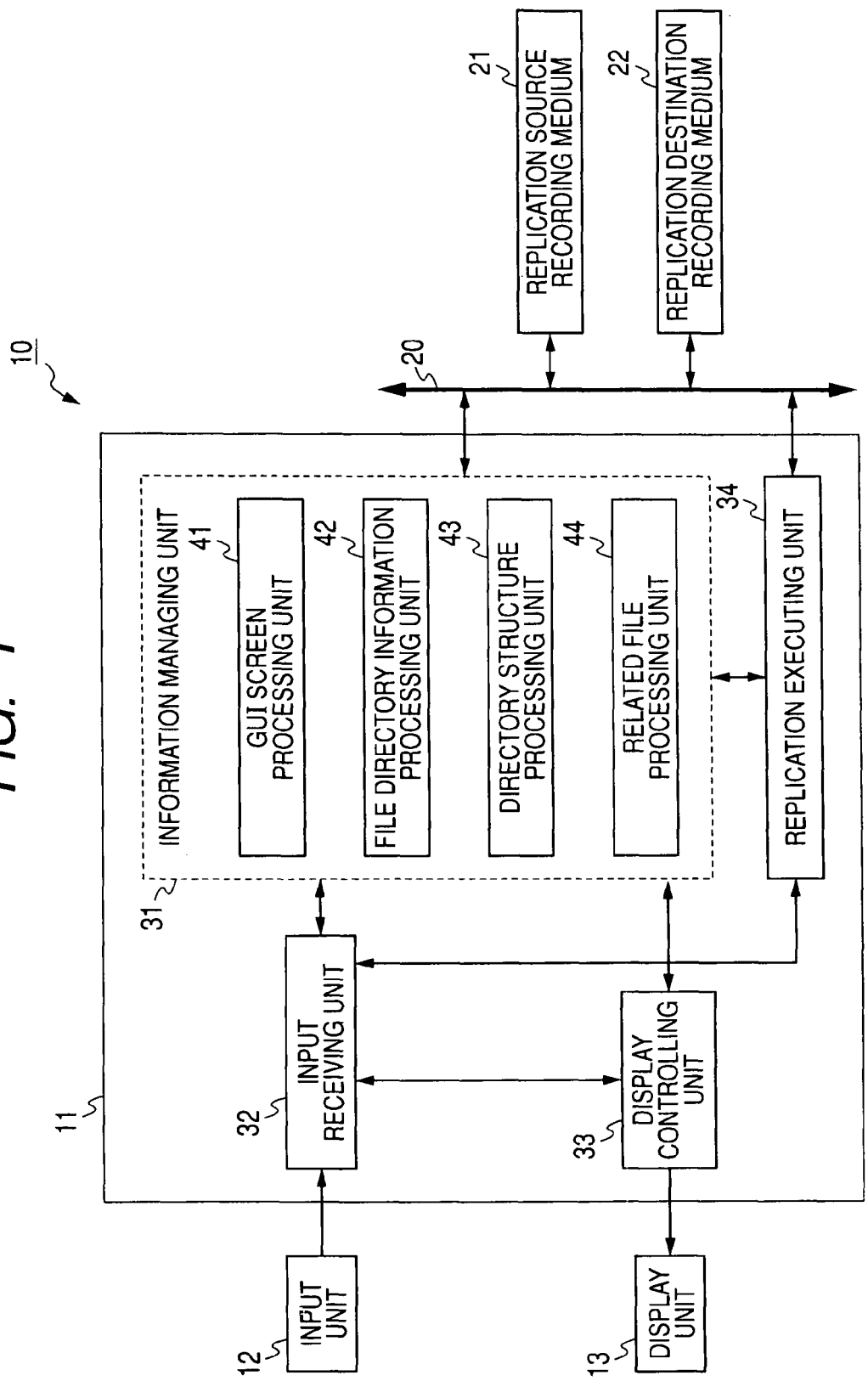
FIG. 1 is a block diagram illustrating a configuration example of an editing device to which the invention is applied.
Figure 16:
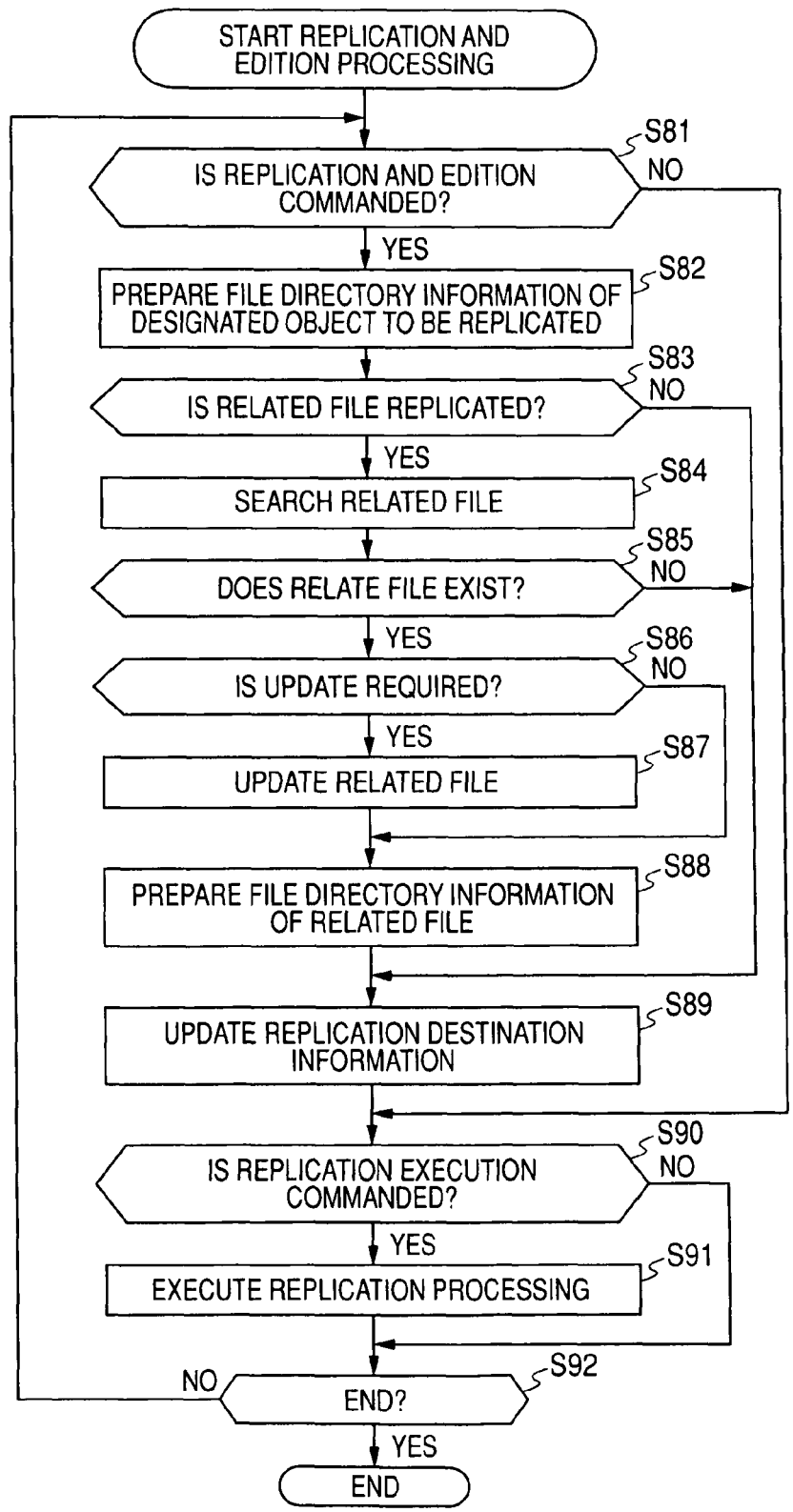
FIG. 16 is a flowchart illustrating an example of a replication and edition process flow.

An embodiment of the invention is a editing method or a program of the editing device (for example, the editing device shown in FIG. 1) for replicating and editing data and includes steps of displaying in the figure the file and the directory of the recording medium (for example, a replication destination recording medium shown in FIG. 1) which is the replication destination of the data on the display unit (for example, a display unit shown in FIG. 1) so that the user can intuitively know the data amounts of the file and the directory and the available capacity of the recording medium as the replication destination information (for example, Step S7 shown in FIG. 3) and executing planned replication and edition on the basis of the replication destination information displayed on the display unit (for example, Step S91 shown in FIG. 16).

Hereinafter, embodiments to which the invention is applied will be described with reference the accompanying drawings.

FIG. 1 is a block diagram illustrating a configuration example of an editing device to which the invention is applied.

In FIG. 1, an editing device 10 is an information processing device for replicating and editing data recorded in the recording medium. The editing device 10 includes a control unit 11 for controlling the units of the editing device 10, an input unit 12 for receiving an user's input, a display unit 13 for displaying a GUI (Graphical User Interface), a bus 20 used for transferring information, and a replication source recording medium 21 and a replication source recording medium 22 connected to the control unit 11 through the bus 20.

The input unit 12 has an input device or an input terminal such as a key board and a mouse. The input unit 12 receives a command input from the user or other information processing devices and provides the command information to the control unit 11. The display unit 13 has monitors such as a CRT (Cathode Ray Tube) display, an LCD (Liquid Crystal Display), a PDP (Plasma Display Panel), an organic EL display (organic Electro Luminescence Display), or a FED (Field Emission Display) and displays information about GUI image or data to be edited.

The bus 20 is constituted by, for example, a PCI bus (Peripheral Components Interconnect bus) or an ISA bus (Industry Standard Architecture bus) and receives information transferred between the units including the control unit 11 connected to the bus 20, the replication source recording medium 21, and the replication destination recording medium 22. The replication source recording medium 21 has the recording medium which is constituted by a hard disc, a semiconductor memory, or a removable media such as a CD (Compact Disc), a DVD (Digital Versatile Disc), or an MD (Mini Disc) mounted on a drive, and data replicated by the control unit 11 is stored in the recording medium. Similar to the replication source recording medium 21, the replication destination recording medium 22 has the recording medium which is constituted by, for example, the hard disc, the semiconductor memory, or the removable medium mounted on the drive and the data replicated by the control unit 11 is stored in the recording medium.

The control unit 11 is a processing unit for performing a control process relating to the replication and edition by controlling the units and includes an information managing unit 31, an input receiving unit 32, a display controlling unit 33, and a replication executing unit 34. The information managing unit 31 is the processing unit for performing a process relating to a user interface of the replication and edition and prepares the GUI screen or acquires information about the data to be replicated, the replication source recording medium 21, or the replication destination recording medium 22 from the replication source recording medium or the replication destination recording medium 22 via the bus 20. The information managing unit 31 includes a GUI screen processing unit 41, a file directory information processing unit 42, a directory structure processing unit 43, and a related file processing unit 44.

The GUI screen processing unit 41 performs a process relating to the GUI screen displayed on the display unit 13 and to which the user refers so as to input a command relating to the replication and edition. For example, the GUI screen processing unit 41 prepares the GUI screen or reflects a change based on the command inputted to the GUI screen to the GUI screen.

As described below, the file directory information processing unit 42 performs a process relating to information (for example, information about the data amount) about the file or the directory of the replication source or the replication destination displayed on the GUI screen. For example, the file directory information processing unit 42 acquires file directory information which is the information about the directories o the files under the directories designated by the user from the replication source recording medium 21 or the replication destination recording medium 22 and prepares data for displaying the information.

As described below, the directory structure processing unit 43 performs a process relating to directory structure information displaying a subservient relationship of the file or the directory of the replication source or the replication destination displayed on the GUI screen. For example, the file directory information processing unit 42 prepares image information such as an arrow displaying the subservient relationship by acquiring the information about the file and the directory involved in the directory designated by the user from the replication source recording medium 21 or the replication destination recording medium 22.

As described below, the related file processing unit 44 performs a process relating to information displaying a reference relationship between the files or the directories of the replication source or the replication destination displayed on the GUI screen. For example, the related file processing unit 44 prepares image information displaying the reference relationship by acquiring information about a related file referenced by a file designated by the user from the replication source recording medium 21 or the replication destination recording medium 22.

The input receiving unit 32 performs a process of receiving the user's command inputted through the input unit 12 and provides the received information to the information managing unit 31, the display controlling unit 33, the replication executing unit 34, or the like. The display controlling unit 33 is controlled by the information managing unit 31 or the input receiving unit 32 and performs a process of displaying the information about the GUI screen or the data to be replicated on the display unit 13. The replication executing unit 34 performs the planned replication process in the information processing unit 31 on the basis of the user's command provided from the input receiving unit 32 and reads out the data to be replicated from the replication source recording medium 21 via the bus 20 and records the data in the replication destination recording medium 22 via the bus 20.

For example, the editing device 10 is an information processing unit for supporting an editing work of contents data such as an image or a sound and is used for the editing work (replication editing work) for extracting and editing desired parts from the contents data acquired by photographing, for example, at the time of manufacturing a program.

For example, the information managing unit 31 of the editing device 10 displays the editing GUI screen shown in FIG. 2 on the display unit 13 via the display controlling unit 33, controls the input unit 12 through the input receiving unit 32, and receives the user's input in the GUI screen. The information managing unit 31 plans an edition of replicating the data recorded in the replication source recording medium 21 and designated by the user and recording the data in the directory of the replication destination recording medium 22 designated by the user by acquiring the information of the file or the directory by the user from the replication source recording medium 21 or the replication destination recording medium 22 on the basis of the user's command.

FIG. 2 illustrates a display example of a replication and edition screen. A replication and edition screen 51 shown in FIG. 2 is the editing (replication and edition) GUI screen for replicating the data, which is displayed as one window on a multiwindow-type GUI screen displayed on the display unit 13. The user makes a replication and edition plan by operating an input to the replication and edition screen 51.

The replication and edition screen 51 includes a replication source path display unit 61, a replication source information display unit 62, a replication destination path display unit 63, a replication destination information display unit 64, and a replication executing button 65 and a replication stopping button 66.

A list of a file or a directory on a path displayed the replication source path display unit 61 is displayed in the replication source information display unit 62. For example, when the user designates the path and makes the path displayed on the replication source path display unit 61 by operating the replication source path display unit 61, the path is displayed on the replication source path display unit 61 and the list of the directories or the files under the directories displayed as the path is displayed on the replication source information display unit 62.

In an example shown in FIG. 2, 'Directory 1', 'Directory 2', 'File 1', and 'File 2' are under a directory of a path 'D:'. Then, the list of the file or the directory is shown in the figure of the bar graph of which length is determined by the data amount of the file or the directory on the replication source information display unit 62 so that the user can intuitively know the data amount of the file or the directory. That is, the data amount of the file or the directory is shown in the length of the figure. Accordingly, the user can easily (intuitively) know the data amount of the file or the directory on the basis of an absolute value of the figure length or a comparison (a comparison with another data amount) with the length of another figure, that is, information viewed with eyes. That is, the user can easily (intuitively) know the data amount of the file or the directory only by checking the list of the file or the directory shown in the figure of the bar graph only by checking the list of the file or the directory without calculating a value or referring to other information. The data amount represents the sum of the data amounts of the files under the directories, that is, an available capacity required for replicating all data under the directory. That is, the file or the directory is shown in larger length as the data amount is larger. In the example shown in FIG. 2, the data amount (all data amounts in 'Directory 2') of 'Directory 2' is larger than the data amount of 'File 1'.

In the replication source path display unit 61, when all files or directories of which paths are designated cannot be simultaneously displayed on the replication source information display unit 62, the file or the directory may be displayed so as to be operatable with a scroll bar provided in the replication source information display unit 62 by the user, as shown in FIG. 2.

For example, the user selects a desired file or directory in the list displayed in the replication source information display unit 62 and copies the display of the selected file or directory by a drag-and-drop operation to the replication destination information display unit 64 when selecting a file or a directory to be replicated.

The replication destination path display unit 63 is the same tool as the replication source path display unit 61 and is operated by the user when the path of the directory which is set as the replication destination is designated. The path (a path which the user designates as the replication destination) is displayed on the replication destination path display unit 63 and the list of the directories or the files under the directories of the path is displayed on the replication destination information display unit 64.

Even in the replication destination information display unit 64, since the length of the file or the directory is determined depending on the data amount of the file or the directory in the same manner as the replication source information display unit 62, the length of the file or the directory is shown in the figure of the bar graph in which length is larger as the data amount is larger. Then, the replication source information display unit 62 and the replication destination information display unit 64 are the same in a relationship between the length and the data amount of the file or the directory. For example, the user can compare the data amounts of the file and the directory by comparing the length of the file or the directory displayed on the replication source information display unit 62 with the length of the file or the directory displayed on the replication destination information display unit 64. Surely, in the replication destination information display unit 64, the scroll bar is provided when all files or directories of which paths are designated cannot be simultaneously displayed as in the replication source information display unit 62.

The user makes a replication and edition plan by operating the replication source path display unit 61 to the replication destination information display unit 64 of the replication and edition screen 51, specifying the data to be replicated, and determining a replicating method of determining which directory will be replicated. The user operates the replication executing button 65 when executing the planned replication and operates the stopping button 66 when stopping the replication work. When the replication executing button 65 is operated, the replication executing unit 34 executes the replication planned as described above.

As described above, the editing device 10 displays the file, the directory, and the available capacity of the recording medium as the replication destination in the bar graph displaying the data amounts as the replication destination information in length. That is, the editing device 10 displays the directory or the available capacity so that the user can intuitively know the data mount only with eyes as is the file. Accordingly, since the user plans the edition while referencing the display, the user can easily compare the data amount of the file or the directory to be replicated with the available capacity of the replication destination by easily knowing the data amount of the file or the directory to be replicated and the user can perform the replication work more certainly by suppressing the failure in replication to occurring without a complicated work. That is, the user can easily perform an accurate replication work.

Figure 3:
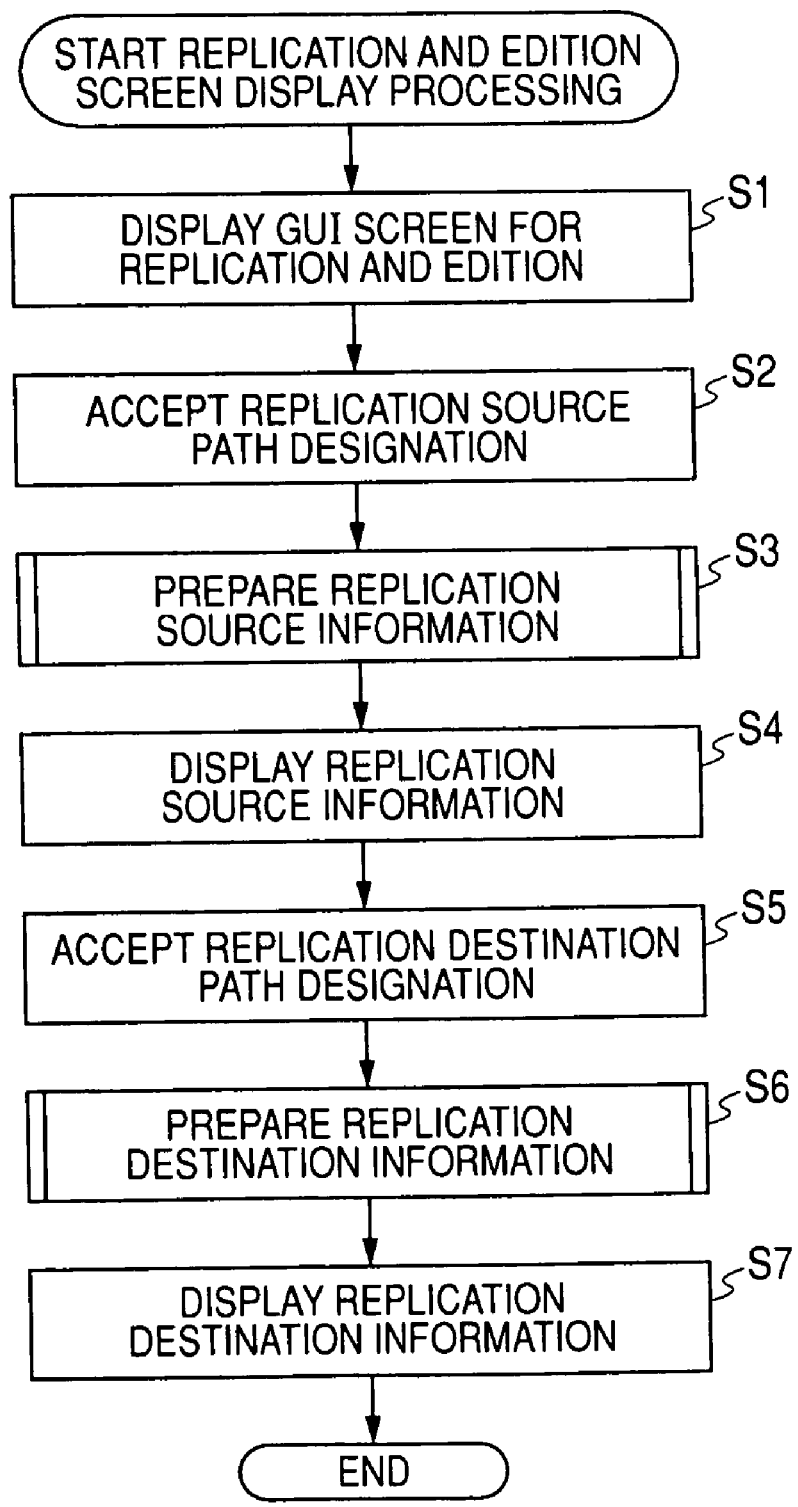
FIG. 3 is a flowchart illustrating an example of a replication and edition screen display process flow.

Next, in the replication and edition described above, an example of the replication and edition screen display process flow which the information managing unit 31 executes will be described with reference to a flowchart shown in FIG. 3.

For example, when the user acquires the replication and edition command of the data inputted by operating the input unit 12 via the input receiving unit 32, the information managing unit 31 starts a replication and edition screen displaying process. When the replication and edition screen displaying process is started, the GUI screen process unit 41 display the GUI screen replication and edition screen 51 for the replication and edition (shown in FIG. 2) in Step S1.

When the replication and edition screen 51 is displayed, the GUI screen processing unit 41 accepts the replication source path designation inputted by the replication source path display unit 61 of the replication and edition screen 51 by controlling the input unit 12 via the input receiving unit 32 in Step S2. When the replication source path designation is accepted, the file directory information processing unit 42 prepares the file and directory information which is the information about the file or the directory designated by the replication source path designation as the replication source information in Step S3. The preparation of the replication source information will be specifically described below.

When the file directory information processing unit 42 prepares the replication source information, the GUI screen processing unit 41 displays the prepared replication source information on the replication source information display unit 62 of the replication edition screen 51 in Step S4.

In Step S5, the GUI screen processing unit 41 accepts the replication destination path designation inputted by operating the replication destination path display unit 63 of the replication and edition screen 51 by the input unit 12 via the input receiving unit 32. When the replication destination path designation is accepted, the file directory information processing unit 42 prepares the file and directory information about the information about the file involved in the directory designated by the replication destination path designation or the directory or the available capacity as the replication destination information in Step S6. The preparation of the replication destination information will be specifically described below.

When the file directory information processing unit 42 prepares the replication destination information, the GUI screen processing unit 41 ends up the replication and edition screen display process by displaying the prepared replication destination information on the replication destination information display unit 64 of the replication and edition screen 51 in Step S7.

When the user commands a change in replication source path or replication destination path, the processes of Steps S2 to S7 are properly executed.

Next, an example of the replication source information preparation process flow executed in Step S3 shown in FIG. 3 will be described with reference to the flowchart shown in FIG. 4. When the replication source information preparation process is started, the file directory information processing unit 42 acquires the information about the file or the directory of the replication source designation path by accessing to the replication source recording medium 21 via the bus 20 in Step S21. When the information of the replication source designation path is acquired, the file and directory information preparing unit 42 calculates the data amount of the file or the directory of the replication source designation path on the basis of the acquired information in Step S22 and prepares the file and directory information of the replication source designation path as the replication source information on the basis of the information in Step S23. When the replication source information is prepared, the file and directory information processing unit 42 executes processes of Step S4 and the following steps by ending up the replication source information preparation process and returning the process to Step S3 shown in FIG. 3.

When the replication destination information preparation process is executed in Step S6 shown in FIG. 3, the file directory information processing unit 42 prepares the replication destination information by performing the same process (Steps S21 to S23) as the replication source information preparation process described with reference to the flowchart shown in FIG. 4 relative to the replication destination designation path.

As described above, since the editing device 10 displays the file and directory information of the path as the replication source information or the replication destination information by displaying the replication and edition screen 51 and making the user designate the replication source path or the replication destination path, the user can easily makes the replication and edition plan.

The file and the directory are displayed on the replication source information display unit 62 or the replication destination information display unit 64 of the replication and edition screen 51 in a same form (expressed in the bar graph). Then, as shown in FIG. 2, the file directory information is partitioned and data name is written therein. The GUI screen processing unit 41 may make the file and directory information being displayed to emphasize the separation between the file and the directory as shown in FIG. 5 so as to facilitate the user to see the file and directory information.

Figure 5A:
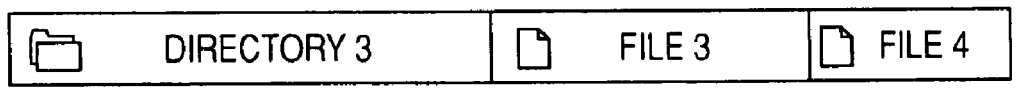
FIG. 5 is a view illustrating another display example of a directory and a file.
Figure 5B:
Figure 5C:

For example, the GUI screen processing unit 41 displays the file and the directory in icons having different shapes or colors in an example of FIG. 5A. The user can more easily discriminate between the file and the directory. In an example of FIG. 5B, the GUI screen processing unit 41 displays a directory name to be surrounded by '<' and '>' and a file name as it is. The user can more easily discriminate between the file and directory by the difference in display of the name. In an example of FIG. 5C, the GUI screen processing unit 41 displays the directory name and the file name with a font or the size, thickness, or color of a character different from each other. The user can more easily discriminate between the file and the directory by the difference in display of the name. Other methods may be used for discriminating between the file and the directory.

Figure 6A:
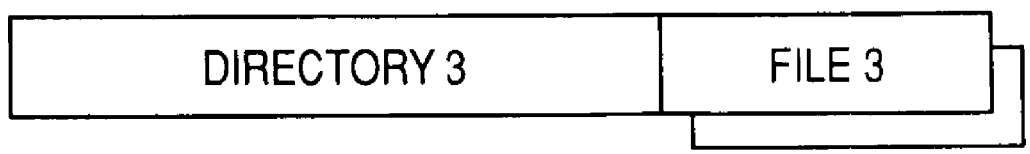
FIG. 6 is a view illustrating further another display example of a directory and a file.

As described above, when there is a file or a directory simultaneously displayed by the replication source information display unit 62 or the replication destination information display unit 64 of the replication and edition screen 51, the GUI screen processing unit 41 displays the file or the directory by using the scroll bar. However, the invention is not limited to the configuration, but any one or both of the file and directory which cannot be simultaneously displayed may be overlapped with each other as shown in FIG. 6A.

Figure 6B:
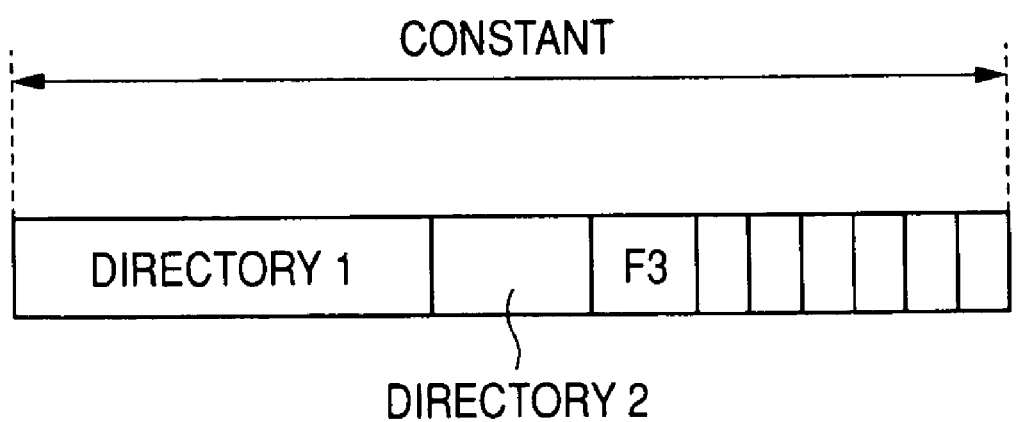

As shown in FIG. 6B, the file and the directory each may be expressed in the rate to a predetermined data amount (or entire data amount). For example, in an example of FIG. 6B, the GUI screen processing unit 41 displays a horizontal length (a range indicated by a horizontal arrow shown in FIG. 6B) with the data amount under the directory of the replication source designation path designated by the user (or the horizontal length (the range indicated by the horizontal arrow in the entire display range of the replication destination information display unit 64) with an available capacity of a drive of the replication destination designation path designated by the user), and displays the length of the file and directory information in the rate to the entire range. In this case, it may be thought that the file name or the directory name cannot be written since the length displaying the file and directory information. In such a case, as shown in FIG. 6B, the file name or the directory name may be simplistically written like 'D2' (Directory 2) or 'F 3' (File 3). The writing of the file name or the directory name may be omitted. In that case, for example, the file (or the directory) name designated by the user may be expressed in a pop-up form.

The length of the file and directory information displayed on the replication source information display unit 62 or replication destination information display unit 64 of the replication and edition screen 51 may be expressed in any form and forms other than the form described above may be used.

In the replication and edition screen 51 shown in FIG. 2, when the user operates the directory of the file directory information displayed on the replication source information display unit 62 or the replication destination information display unit 64 (for example, click the directory by placing a pointer to the directory), the GUI screen processing unit 41 makes a child window which is a subscreen of the replication and edition screen 51 displayed on the displaying unit 13 and makes the file directory information under the directory operated by the user displayed on the child window.

Figure 7A:
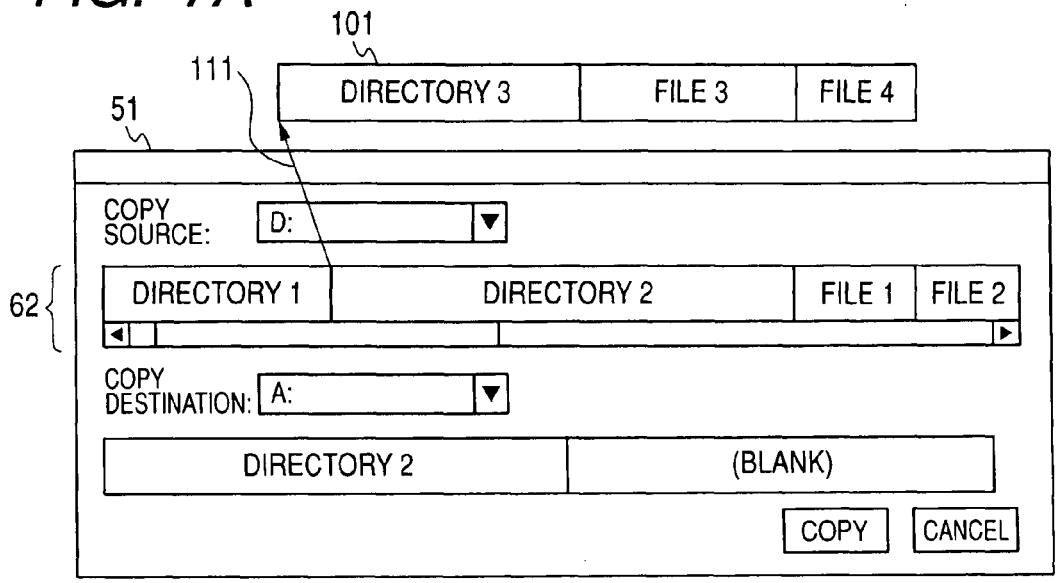
FIG. 7 is a view illustrating a display example of a child window and directory structure information.

FIG. 7A illustrates a display example of a child window when the user operates the directory displayed on the replication source information display unit 62. In FIG. 7A, a child window 101 is the subwindow displayed when the user operates 'Directory 2' of the replication source information display unit 62 and includes the file and directory information of the 'Directory 3', 'File 3', and 'File 4' under 'Directory 2' displayed thereon. The file and directory information is expressed in the bar graph displaying the data amount in length similar to the replication source information display unit 62.

The bar graphs of the file directory information displayed on the file directory information displayed on the child window 101 and the file and directory information displayed on the replication source information display unit 62 may be configured such that the data amounts expressed in the same length are the same to, or different from, each other.

Directory structure information 111 displaying a relationship (that is, a directory structure) between the child window 101 and the 'Directory 2' is expressed in an arrow image directed to the child window 101 from the 'Directory 2'. That is, an arrow (the directory structure information 111) shown in FIG. 7A indicates the file or the directory where the 'Directory 3', 'File 3', and 'File 4' are provided under the 'Directory 2'.

The user can easily know the directories or the files under the 'Directory 2' and designate the file or the directory in the directory of the replication source information display unit 62 as an replication target without redesignating the replication source path by the display described above. That is, the user can also designate the file and directory information displayed on the child window 101 as the replication target (for example, drag and drop the file and directory information).

As described above, the child window 101 is a window different from the replication and edition screen 51. Accordingly, the GUI screen processing unit 41 can display the child window 101 in a predetermined position of the replication and edition screen 51. For example, the GUI screen processing unit 41 may determine a display position of the child window 101 so as not to be overlapped with the replication and edition screen 51 on the basis of the position of the replication and edition screen 51. For example, the child window 101 is movable to a predetermined position when the user drags and drops the child window 101. However, in the directory structure information 111, directions and lengths are updated (follows) so as to show a subservient relationship between the directories (in FIG. 7A, so as to be directed to the child window 101 from the 'Directory 2').

Figure 7B:
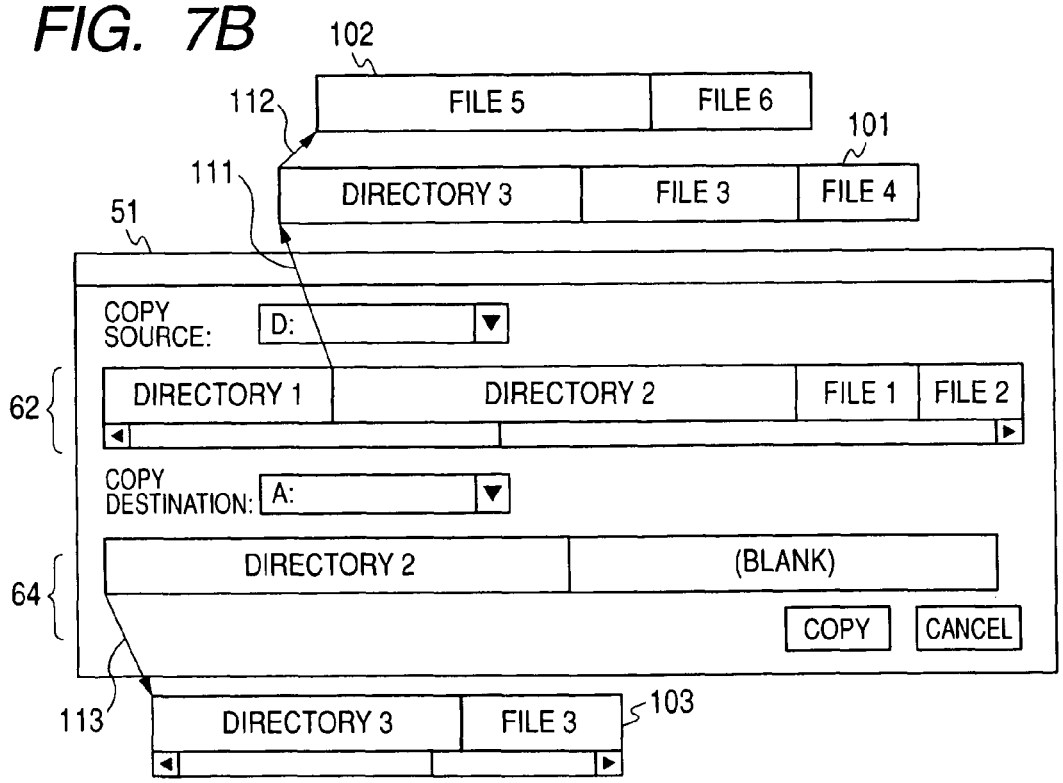

When the user operates the directory of the child window, a same child window is additively displayed as shown in FIG. 7B. In an example of FIG. 7B, the file directory information ('File 5' and 'File 6') under the 'Directory 3' of the child window 101 are displayed in a child window 102 different from the replication and edition screen 51 and the child window 101. In the child window 102 similar to the child window 101, the file and directory information is expressed in the bar graph expressing the data amount in length. The directory structure information 112 displaying the structure of the directory is expressed in an arrow directed to the child window 102 from the 'Directory 3'.

The user can easily know further subservient files or directories and designate the further subservient files or directories as the replication target without redesignating the replication source path by the display described above. That is, the user may designate the file directory information displayed in the child window 102 as the replication target (for example, drag and drop the file directory information).

In the same manner as the child window 101, the GUI screen processing unit 41 can position the child window 102 in a predetermined position of the replication and edition screen 51 and the child window 101. For example, the GUI screen processing unit 41 may determine a display position of the child window 102 so as not to be overlapped with the replication and edition screen 51 or the child window 101 on the basis of the position of the replication and edition screen 51 or the position of the child window 101. For example, the child window 102 is movable to a predetermined position when the user drags and drops the child window 102. However, the display of the directory structure information 112 also follows the movement thereof.

As shown in FIG. 7B, the display is the same as that in the replication destination information display unit 64. Accordingly, as shown in FIG. 7B, the user can display the file directory information under the 'Directory 2' in the child window 103 by operating the 'Directory 2' displayed on the replication destination information display unit 64. Even in this case, the directory structure information 113 displaying the structure of the directory is expressed in an arrow directed to the child window 103 from the 'Directory 2'.

The user can easily know further subservient files or directories of the replication destination and designate the further subservient files or directories of the replication destination designation path as the replication destination without redesignating the replication destination path by the display described above. That is, the user may designate the file directory information displayed in the child window 103 as the replication destination (for example, the drop destination).

A child window 103 can be displayed in a predetermined position similar to the child window 101 or the child window 102 and is movable by the user's operation. However, the display of the directory structure information 113 follows the movement thereof.

As shown in the child window 103 of FIG. 7B, the scroll bar may be provided. By this configuration, it is possible to make the display of the child window 103 smaller (to shorten the length of the display thereof) without the number of the files or the directories.

Figure 8:
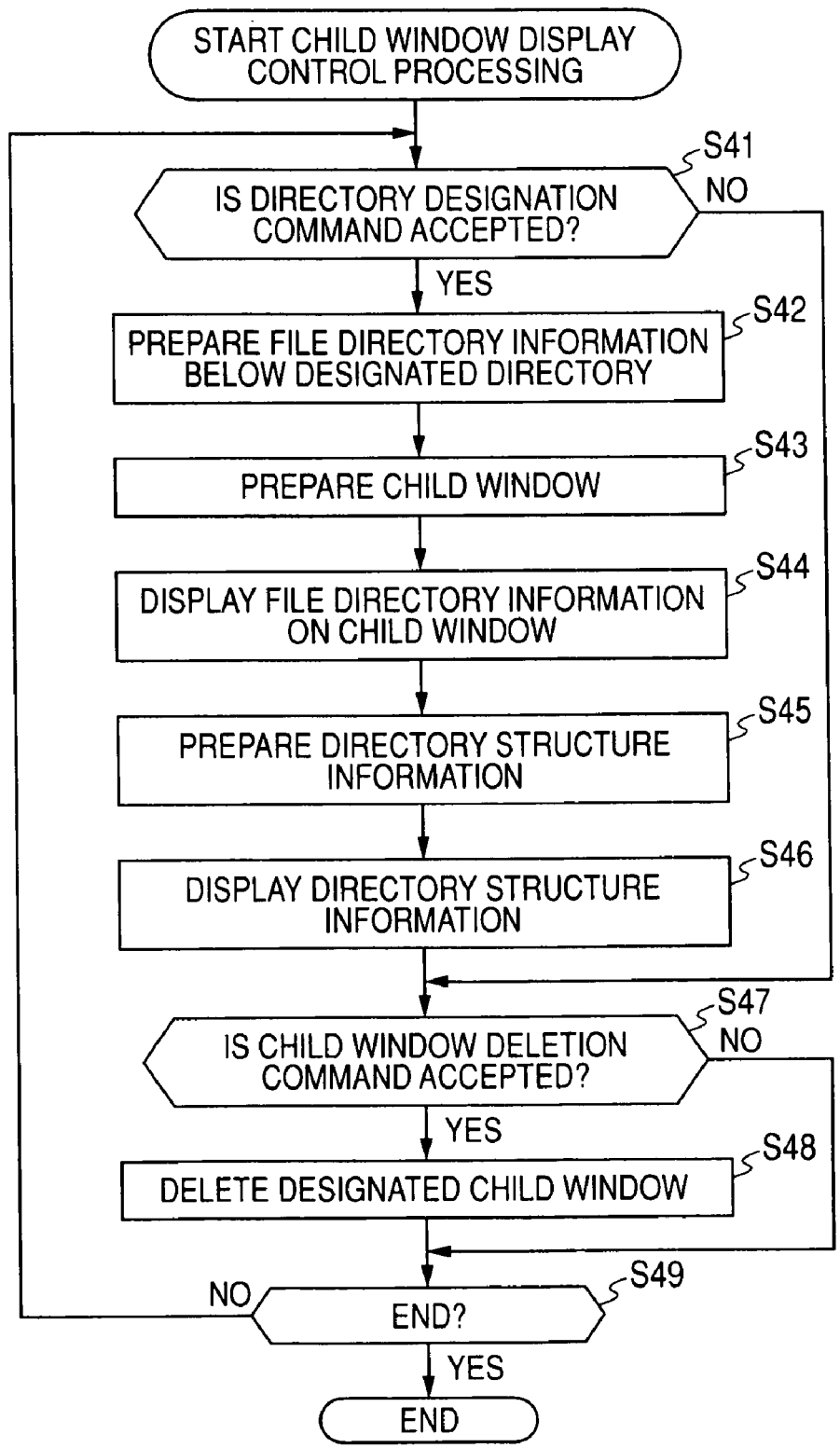
FIG. 8 is a flowchart illustrating an example of a child window display control process flow.

An example of the child window display control process flow of controlling the display of the child window described above will be described with reference to a flowchart shown in FIG. 8.

When the child window display control process is started, the GUI screen processing unit 41 controls the input receiving unit 32 and determines whether or not the a directory designation command inputted via the input unit 12 is accepted. When the user performs a predetermined designation operation for the directory displayed on the replication source information display unit 62 by operating the input unit 12, the replication destination information display unit 64, or the child window, the input receiving unit 32 accepts the operation as the directory designation command. The GUI screen processing unit 41 determines that the directory designation command is accepted, the GUI screen processing unit 41 makes the process performed in Step S42. In Step S42, the file directory information processing unit 42 prepares the file directory information under a directory (a parent directory) designated by the directory designation command. The GUI screen processing unit 41 prepares the child window on the display screen displayed on the display unit 13 in Step S43 and displays the file directory information prepared by the file directory information processing unit 42 on the child window in Step S44. In Step S45, when the directory structure information processing unit 43 prepares directory structure information displaying a relationship between the child window and the parent directory (the directory designated by the directory designation command), the GUI screen processing unit 41 displays the directory structure information on the display unit 13 as image information (for example, an arrow image linking the child window with the parent directory) in Step S46.

When the process of Step S46 is ended, the GUI processing unit 41 makes the process performed in Step S47. In Step S41, when the GUI screen processing unit 41 determines that the directory designation command is no accepted, the GUI screen processing unit 41 makes the process performed in Step S47.

In Step S47, the GUI screen processing unit 41 controls the input receiving unit 32 and determines whether or not the a window deletion command inputted via the input unit 12 is accepted. When the user performs a predetermined designation operation for the child window displayed on the display unit 13 by operating the input unit 12, the input receiving unit 32 accepts the operation the operation as the directory deletion command. When the GUI screen processing unit 41 determines that the child window deletion command is accepted, the GUI screen processing unit 41 makes the process performed in Step S48 and deletes the designated child window and directory structure information linking the child window with the mother window from the display screen. When a child window is further hung on the designated child window (there is a child window whose parent directory is the directory displayed on the designated child window), the GUI screen processing unit 41 deletes the hung child window or the directory structure information. The GUI screen processing unit 41 performs the same operation with respect to subservient child windows.

When the child window is deleted, the GUI screen processing unit 41 makes the process performed in Step S49. The GUI screen processing unit 41 makes the process performed in Step S49 when determining that the child window deletion command is not accepted in Step S47.

In Step S49, the GUI screen processing unit 41 determines whether or not the child window display control process is ended. When determining that the child window display control process is not ended, the GUI screen processing unit 41 returns the process to Step S41 and repeats the process thereafter. Alternatively, when determining that the child window display control process is ended in Step S49 by the switching to a mode in which the child window is not displayed, or the like, the GUI screen processing unit 41 ends up the child window display control process.

Since the child window display control process is performed in the flow described above, the user can easily control of the display and the nondisplay of the child window (subservient file and directory information) only by designating the directory displaying the child window or by designating the child window to be deleted. Accordingly, since the user can easily know the subservient file or directory, the user can easily perform the replication and edition work All operations displaying the directory designation command or the child window deletion command can be used.

Figure 9A:
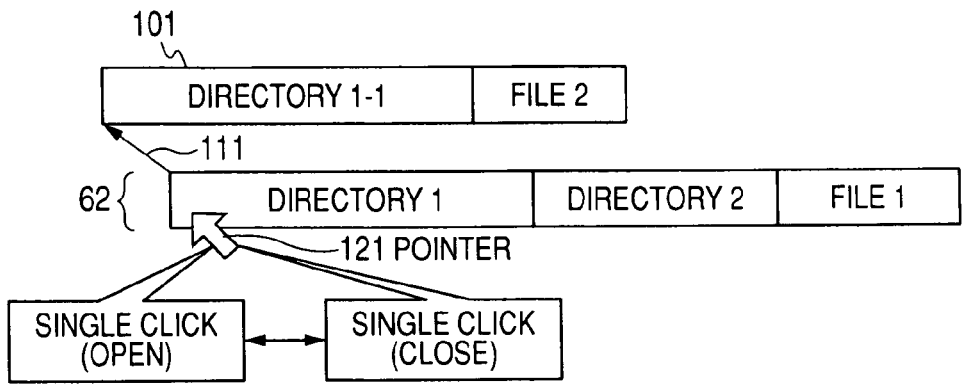
FIG. 9 is a view illustrating examples of opened and closed states of a child window.

For example, as shown in FIG. 9A, when the user performs a single click operation in a state where the child window 101 hung on the directory is not displayed by positioning a pointer 121 on a desired directory ('Directory 1') of the file directory information displayed on the replication source information display unit 62, the child window 101 may be opened (the child window 101 and the directory structure information 111 are displayed) and when the user performs the single click operation in a state where the child window 101 is not displayed, the child window 101 may be closed (the child window 101 and the directory structure information 111 are deleted).

By this configuration, the user can easily control the opened/closed state of the child window by one kind of operation.

Figure 9B:
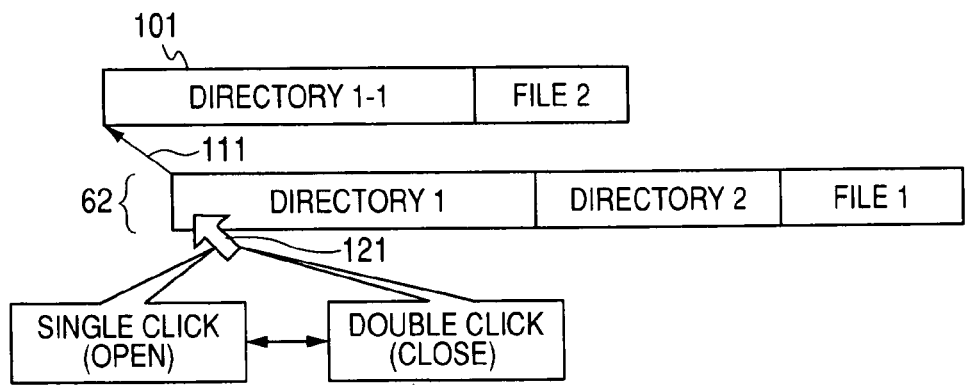

For example, as shown in FIG. 9B, when the child window 101 is closed (the child window 101 and the directory structure information 111 are deleted), the user may perform a double click operation. The GUI screen processing unit 41 can reduce the number of operation errors in the opened/closed state of the child window by discriminating an operation of opening the child window from an operation of closing the child window.

Figure 9C:
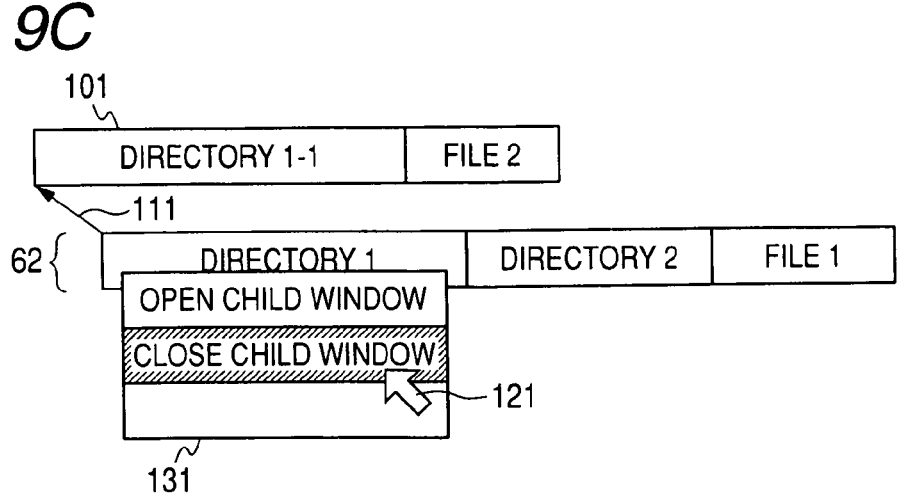

For example, as shown in FIG. 9C, when the user positions the pointer 121 on a desired directory ('Directory 1') and right-clicks on the directory, a menu screen 131 is opened and when the user performs an operation of selecting a menu of 'Open child window' being displayed on the menu screen 131 (for example, position the pointer 121 on the menu and left-click the menu), the child window 101 hung on the firstly designated directory ('Directory 1') is opened. When the user performs the operation of selecting a menu of 'Close child window' displayed on the menu screen 131 (for example, position the pointer 121 on the menu and left-click the menu), the child window 101 hung on the firstly designated directory ('Directory 1') is closed. The GUI screen processing unit 41 can reduce the number of operation errors even less by making the operation more complicated so that the user's intention is required to control the opened/closed state of the child window by using the menu screen 131.

Figure 10A:
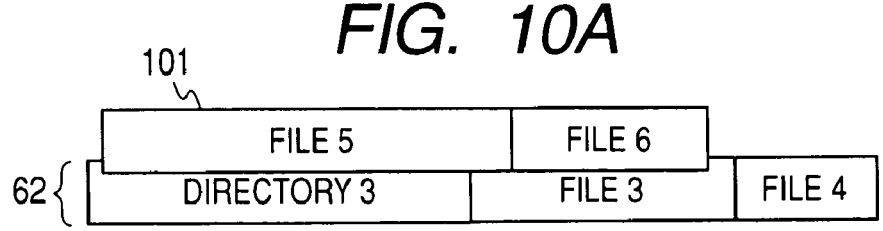
FIG. 10 is a view illustrating another display example of a child window and directory structure information.

As described above, the directory structure information is expressed in the arrow, but the invention is not limited to the configuration. However, for example, as shown in FIG. 10A, a predetermined position of the child window 101 may be overlapped with the parent directory (in an example of FIG. 10A, 'Directory 3'). However, in this case, the display position of the child window 101 is limited. Further, in this case, since the directory structure information is displayed by the display position of the child window 101, a screen corresponding directly to the directory structure information is not displayed.

Figure 10B:
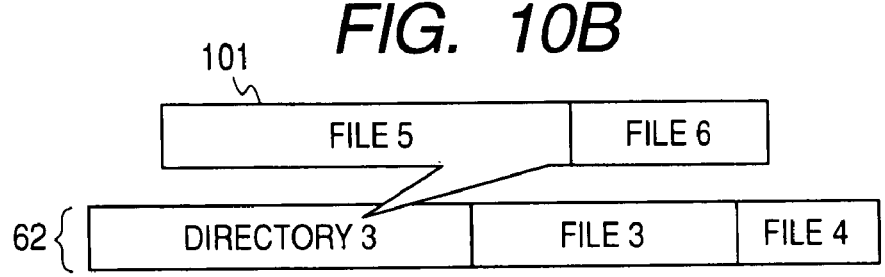

For example, as shown in FIG. 10B, the child window 101 may be expressed in the form of a bubble blowing from the parent directory (in an example of FIG. 10B, 'Directory 3'). In this case, a triangle part displaying a blowing bubble inlet represents the directory structure information.

Figure 10C:
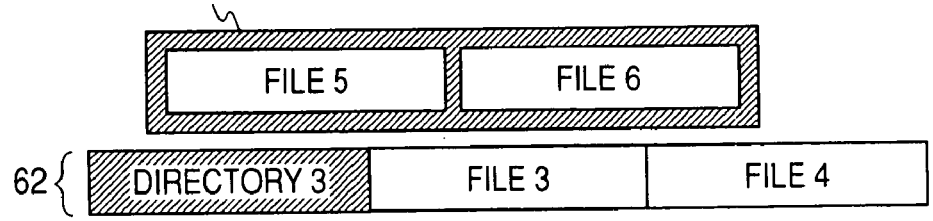

For example, as shown in FIG. 10C, the parent directory (in an example of FIG. 10C, 'Directory 3') is expressed in a color or a shape (in the example of FIG. 10C, a slant line to a solid line of other file directory information) different from other file directory information and the child window 101 may be expressed in the same color or shape as the parent directory (in the example of FIG. 10C, a frame of the file and directory information of the child window 101 is expressed in the same shape as the parent directory). In this case, the common color or shape between the child window 101 and the parent directory represents the directory structure information.

Figure 10D:
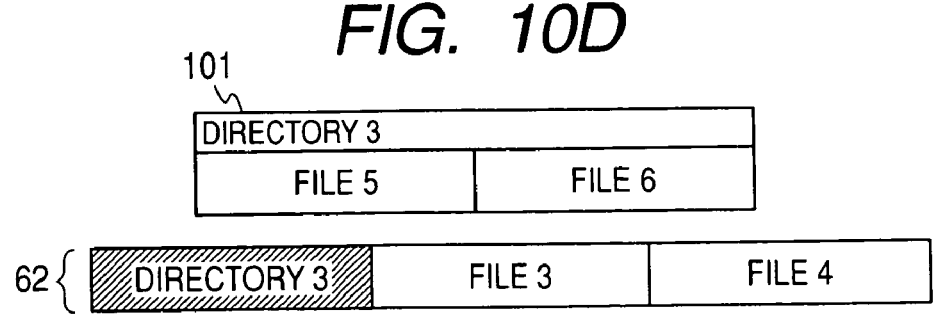

For example, as shown in FIG. 10D, the name of the parent directory (in an example of FIG. 10D, 'Directory 3') may be displayed on the child window 101. In the example of FIG. 10D, the parent directory name 'Directory 3' in addition to the file directory information ('File 5' and 'File 6') are displayed on the child window 101. In this case, the display of the parent directory name represents the directory structure information.

The control unit 11 makes related file relationship information displaying a relationship (for example, a reference relationship) between a file designated by the user and a file other than the designated file in the file directory information displayed on the replication and edition screen 51 or the child window as shown in FIG. 2.

FIG. 11A illustrates a display example when the user designates that the related file relationship information of 'File 3' displayed on the child window 101 is displayed. Related file relationship information 151 relating to the 'File 3' designated by the user is expressed in the arrow image. The 'File 1' linked to the 'File 3' by the related file relationship information 151 is a file relating to the 'File 3'. The related file represents a file required for the process (for example, a reproducing process) of 'File 3'.

For example, when the 'File 3' is reproduced with reference to the 'File 1', the 'File 1' is required for the reproducing process of the 'File 3'. For example, when the 'File 1' includes information used for managing the 'File 3', it may be necessary to reflect the update of the 'File 3' to the 'File 1'. When the 'File 3' is replicated, it may be necessary to replicate the 'File 1' and the 'File 3' simultaneously.

A related file processing unit 44 sets the 'File 1' to the related file of the 'File 3' and shows a relationship therebetween with the related file relationship information 151 formed of the arrow image directed from the 'File 3' to the 'File 1'.

When the child window 101 is closed and the 'File 3' is deleted, the related file 'File 1' of the 'File 3' is linked with the parent directory 'Directory 2' of the 'File 3' by the related file relationship information 152. That is, when the related file information extends from the directory, the related file information shows a relationship between one and the other file of subservient files of the directory.

Figure 12:
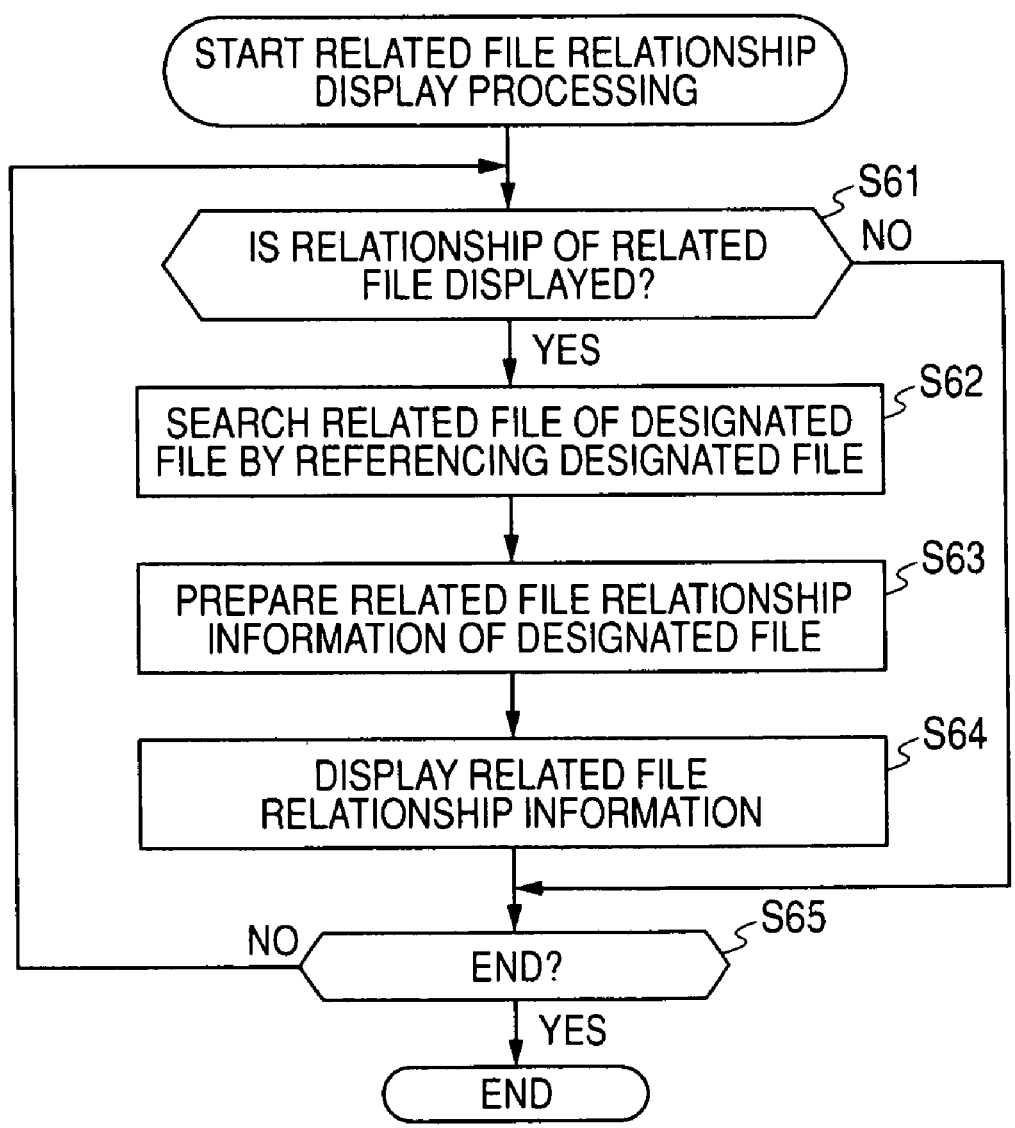
FIG. 12 is a flowchart illustrating an example of related file relationship display process flow.

An example of a related file relationship display process controlling the display of the related file relationship information will be described with reference to a flowchart shown in FIG. 12.

When the related file relationship display process is started, the GUI screen processing unit 41 controls the input receiving unit 32 and determines whether or not the relationship of the related files is displayed on the basis of the user's command inputted through the input unit 12 in Step S61. When determining that the relationship is displayed, the GUI screen processing unit 41 makes the process performed in Step S62. The related file processing unit 44 searches a designated related file with reference to the designated file in Step S62 and prepares the related file relationship information of the designated file on the basis of the search result in Step S63. In Step S64, the GUI screen processing unit 41 makes the prepared related file relationship information displayed on the display screen of the display unit 13.

When the related file relationship information is displayed, the GUI screen processing unit 41 makes the process performed in Step S65. In Step S61, for example, the GUI screen processing unit 41 controls the input receiving unit 32 and determines that the related file relationship is not displayed via the input unit 12 on the basis of the user's command, the GUI screen processing unit 41 makes the process performed in Step S65.

In Step S65, when the GUI screen processing unit 41 determines that the related file relationship display process is ended by determining whether or not the related file display process is ended, the GUI screen processing unit 41 returns the process to Step S61 and makes the process thereafter performed. For example, when the GUI screen processing unit 41 determines that the related file relationship display process is ended in Step S65 by being switched to a mode in which the related file relationship is not displayed, the GUI screen processing unit 41 ends up the related file relationship display process.

Since the related file relationship display process is performed in a flow described above, the user can easily control the display and the nondisplay of the related file relationship. Accordingly, since the user can easily know the relationship between the files, the user can easily perform the replication and edition work.

All operations of commanding the display or the nondisplay of the related file relationship information may be used.

Figure 13A:
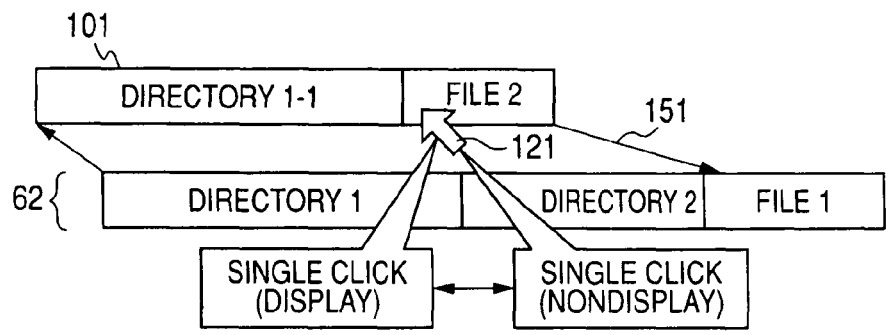
FIG. 13 is a view illustrating examples of display and nondisplay controls of related file relationship.

For example, as shown in FIG. 13A, when the user performs a single click operation in a state where the related file relationship information 151 of the file is not displayed by positioning a pointer 121 on a desired file ('File 2'), the related file relationship information 151 is displayed and when the user performs the single click operation in a state where the related file relationship information 151 is displayed, the related file relationship information 151 may be deleted. By this configuration, the user can easily control the display and the nondisplay of the related file relationship information by one kind of operation.

Figure 13B:
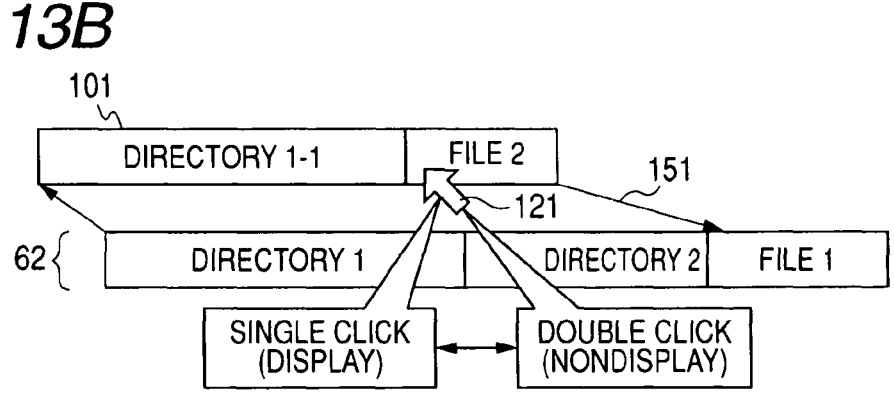

For example, as shown in FIG. 13B, when the related file relationship information is deleted, the user may perform a double click operation. As described above, the GUI screen processing unit 41 can reduce the number of operation errors in the display and the nondisplay of the related file relationship information by discriminating an operation of displaying the related file relationship information from an operation of deleting the related file relationship information.

Figure 13C:
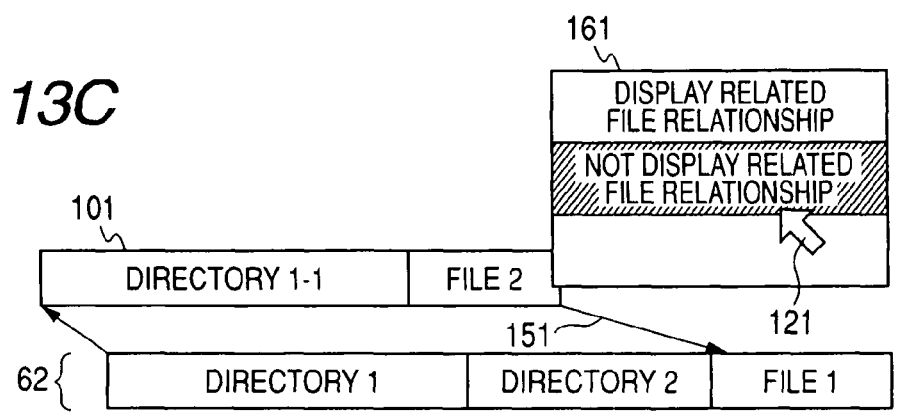

For example, as shown in FIG. 13C, when the user positions the pointer 121 on the desired file ('File 2') and right-clicks on the file, a menu screen 161 is opened and when the user performs an operation of selecting a menu of 'Display related file relationship' being displayed on the menu screen 161 (for example, position the pointer 121 on the menu and left-click the menu), the related file relationship information 151 of the firstly designated file ('File 2') is displayed. When the user performs the operation of selecting a menu of 'Not display related file relationship' displayed on the menu screen 161 (for example, position the pointer 121 on the menu and left-click the menu), the related file relationship information 151 of the firstly designated file ('File 2') is deleted. The GUI screen processing unit 41 can reduce the number of operation errors even less by making the operation more complicated so that the user's intention is required to control the display of the related file relationship information by using the menu screen 161.

Figure 14A:
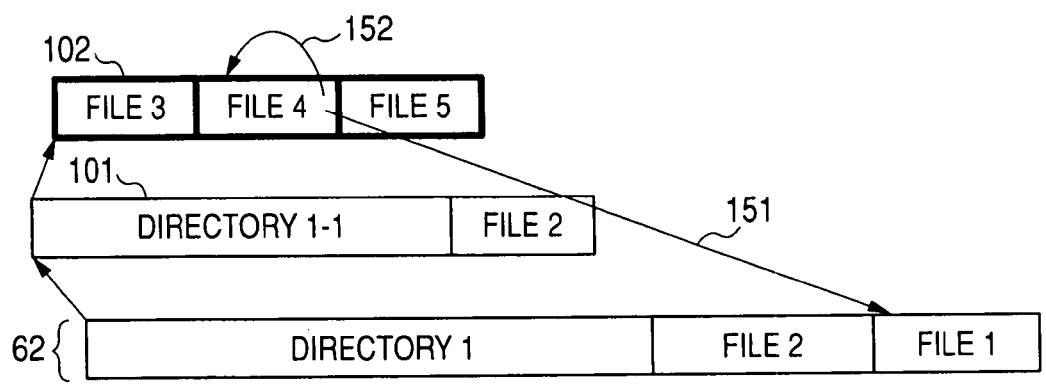
FIG. 14 is a view illustrating another display example of related file relationship.

For example, when the related file is an entire file under a predetermined directory, the related part may be surrounded by thick frames as shown in FIG. 14A. In FIG. 14A, related file relationship information 152 relating 'File 4' to 'File 3' to 'File 5' surrounded by the thick frames represents that a related file of the 'File 4' is the 'File 3' to the 'File 5'.

Figure 14B:
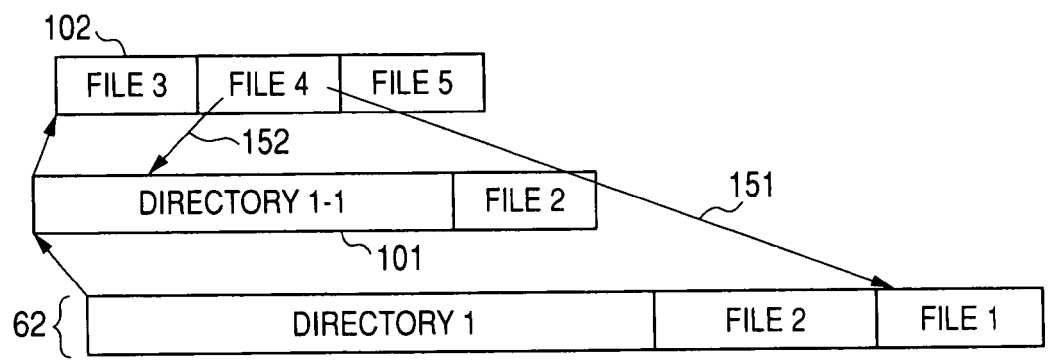

As shown in FIG. 14B, the related file relationship information 152 relating the 'File 4' to 'Directory 1-1' which is an ancestor directory may be displayed instead of the thick frames.

When making a replication and edition plan on the replication and edition screen 51 described above, the user specifies a replication target from the file directory information (or the file directory information displayed on the child window derived from the directory) displayed on the replication source information display unit 62 of the replication and edition screen 51 and replicates the replication target to the replication destination information display unit 64 by dragging and dropping the replication target and makes a replication and edition plan.

Figure 15:
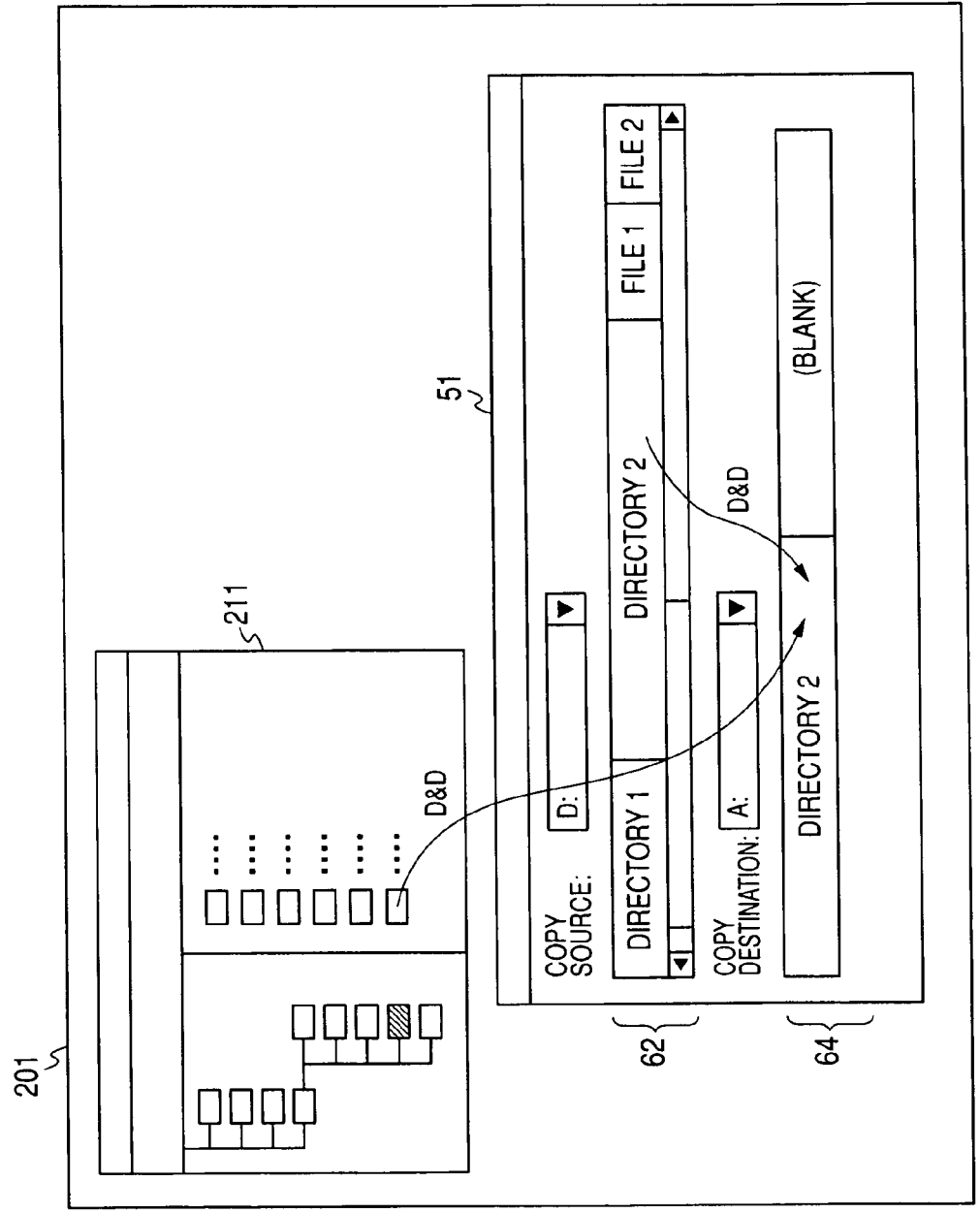
FIG. 15 is a view illustrating an example of a replication and edition command.

As shown in FIG. 15, in the replication and edition plan, the user may drag and drop the files or the directories from a window 211 other than the replication and edition screen 51 such as a file management tool, displayed on a display screen 201 displayed on the display unit 13 to the replication destination information display unit 64.

After making the plan as described above, the user operates a replication executing button 65 to start an actual replication process.

An example of a replication and edition process flow controlling the replication and edition will be described with reference to a flowchart shown in FIG. 16.

When the replication and edition process is started, the GUI screen processing unit 41 controls the input receiving unit 32 and determines whether or not the replication and edition is commanded by the user in Step S81. When determining that the replication and edition is commanded by the user, the GUI screen processing unit 41 makes the process performed in Step S82.

In Step S82, the file directory information processing unit 42 prepares the file and directory information of a designated replication target (file or directory). The related file processing unit 44 determines whether or not the related file of the designated replication target is also replicated in Step S83. When determining that the related file of the designated replication target is replicated on the basis of, for example, a mode set-up, the related file processing unit 44 searches the related file of the designated replication target by making the process performed in Step S84 and determines whether or not the related file of the designated replication target exists in Step S85.

When determining that the related file of the designated replication target exists, the related file processing unit 44 makes the process performed in Step S86. The related file processing unit 44 determines whether or not the updating of the related file is required to replicate the related file in Step S86. When determining that the updating of the related file is required, the related file processing unit 44 makes the process performed in S87. After the updating of the related file, the related file processing unit 44 makes the process performed in Step S88. When determining that the updating of the related file is not required in Step S86, the file processing unit 44 makes the process performed in Step S88.

In Step S88, the file directory information processing unit 42 prepares the file directory information of the related file and makes the process performed in Step S89. When determining that the related file is not replicated in Step S83 or when determining that the related file does not exist in Step S85, the related file processing unit 44 makes the process performed in Step S89 without performing the process of Step S88.

In step S89, the GUI screen processing unit 41 updates the display of the file directory information (replication destination information) displayed on the replication destination information display unit 64 and then performs the process of step S90. When it is judged in step S81 that the replication edition is not commanded, the GUI screen processing unit 41 performs the step of S90.

In step S90, the GUI screen processing unit 41 controls the input receiving unit 32 to judge whether the execution of replication is commanded by means of a user's operation of the replication executing button 65, etc. When it is judged that the execution of replication is commanded, the process of step S91 is performed. In step S91, the replication executing unit 34 executes the replication process to read out information recorded in the replication source recording medium 21 and to write the read-out information to the replication destination recording medium 22.

When the replication process is finished, the replication executing unit 34 performs the process of step S92. When it is judged in step S90 that the execution of replication is not commanded, the GUI screen processing unit 41 performs the process of step 92.

In step S92, the GUI screen processing unit 41 judges whether the replication editing process is finished. When it is judged that the replication editing process is not finished, the GUI screen processing unit 41 returns the process to step S81 and repeats the processes subsequent thereto. When it is judged in step S92 that the replication editing process is finished, the GUI screen processing unit 41 ends the replication editing process.

In this way, by performing the replication editing process, the user can easily replicate a desired file or directory to a desired directory only by performing a drag-and-drop operation to operate the replication executing button 65.

The file or directory to be replicated may be displayed during the drag-and-drop operation.

Figure 17:
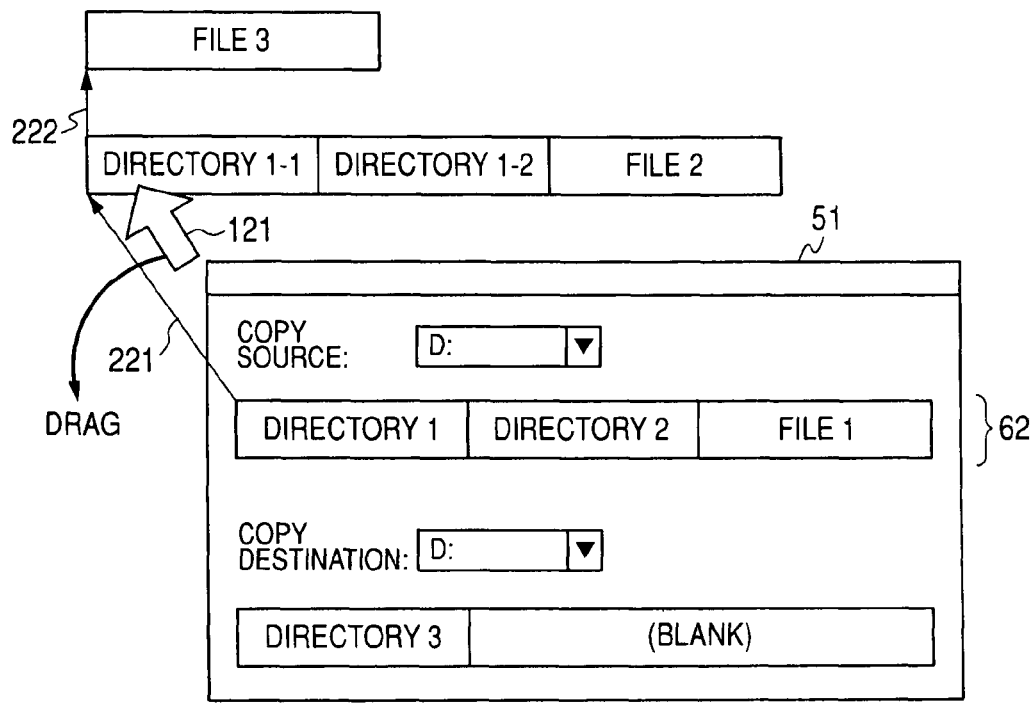
FIG. 17 is a view illustrating an example of a replication and edition command.
Figure 18:
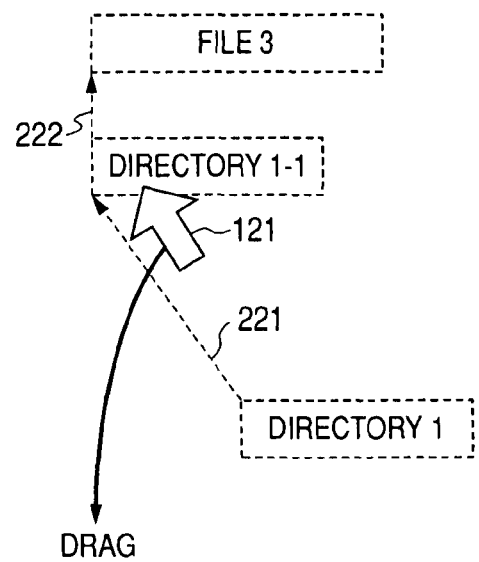
FIG. 18 is a view illustrating an example of a replication and edition command.

For example, when the user operates the pointer 121 to designate and drag "directory 1-1" of the child window as shown in FIG. 17, a picture in which the parent directory "directory 1" indicated by the directory structure information 221 and the file "file 3" of the child window indicated by the directory structure information 222 along with "directory 1-1" are dragged as a replication target by the pointer 121 is displayed as shown in FIG. 18. At this time, in order to clearly display the replication target in drag, as shown in FIG. 18, the information may be marked by a dotted line (or a translucent weak color).

Figure 19:
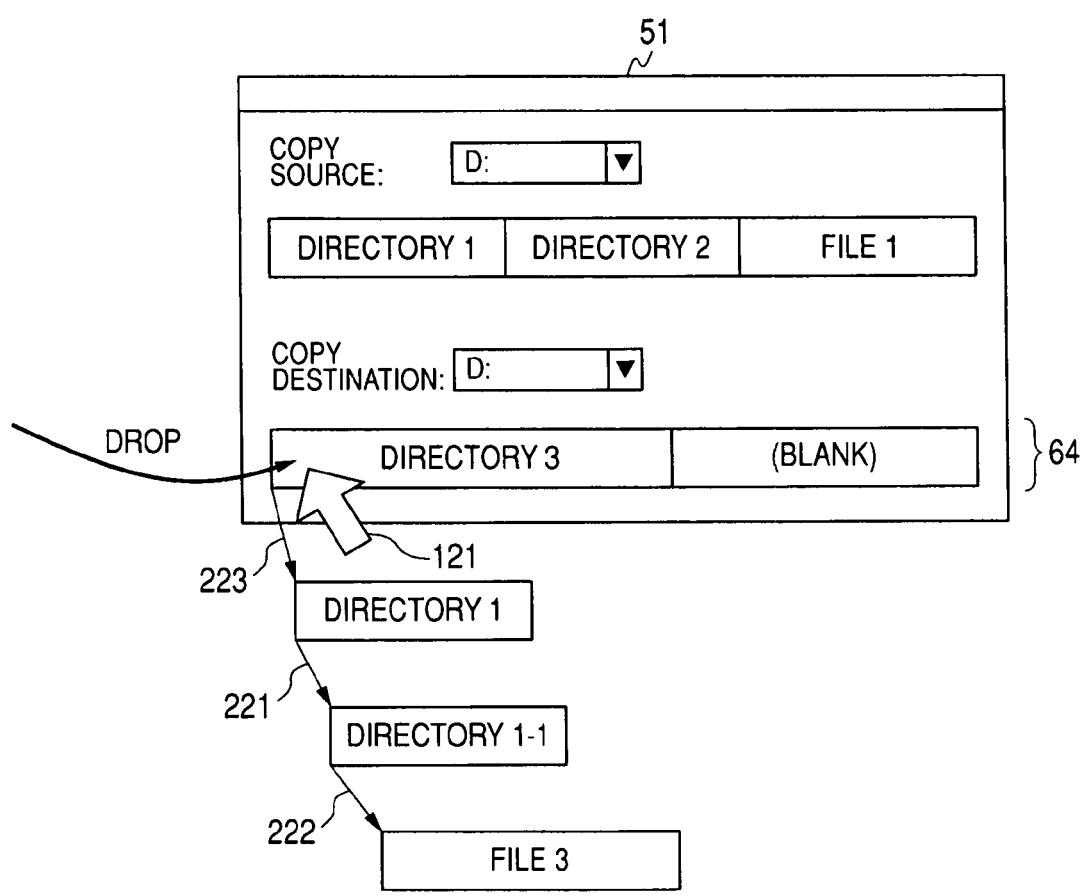
FIG. 19 is a view illustrating an example of a replication and edition command.

In this way, when the dragged replication target is dropped on the replication destination information display unit 64 as shown in FIG. 19, the dropped replication target constructs a directory structure as needed and is displayed on the replication destination information display unit 64. In the example shown in FIG. 19, since the replication target is dropped on "directory 3", new directory structure information 223 is displayed.

Figure 20:
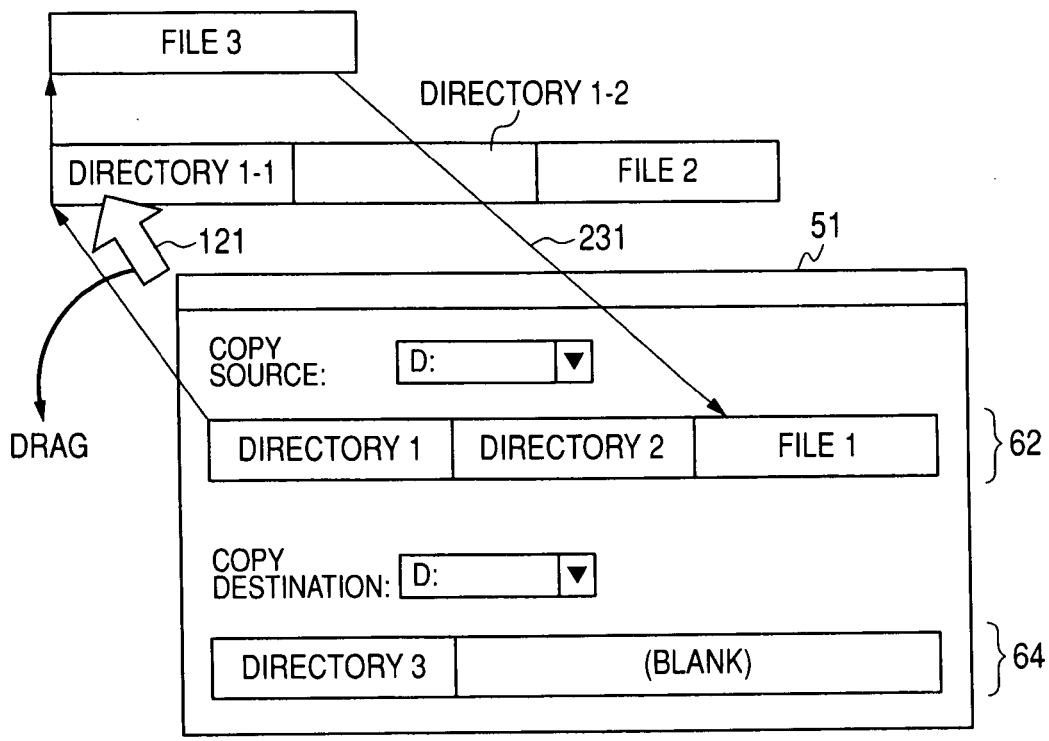
FIG. 20 is a view illustrating an example of a replication and edition command.
Figure 21:
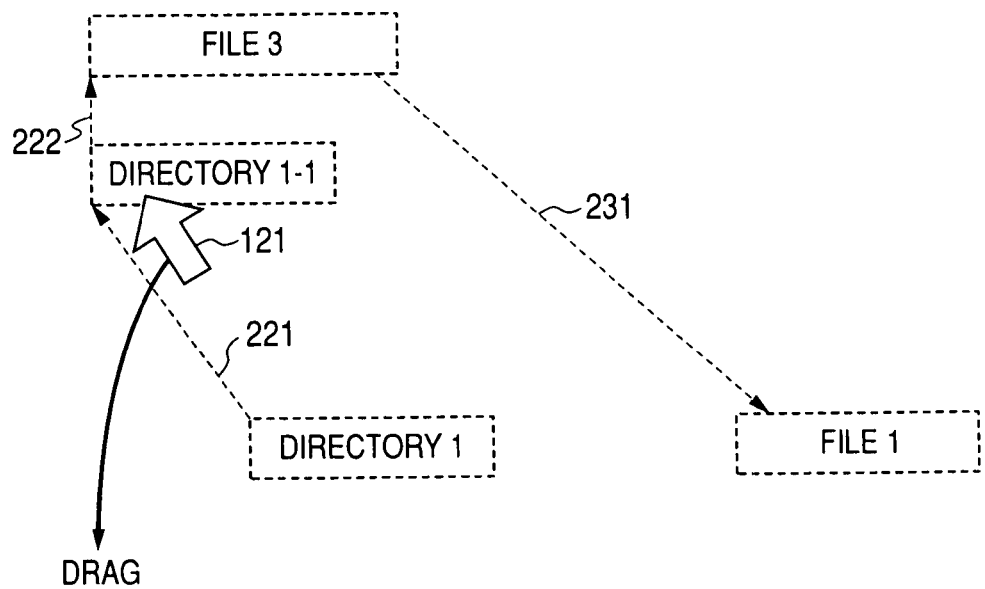
FIG. 21 is a view illustrating an example of a replication and edition command.

For example, when the user operates the pointer 121 to designate and drag "directory 1-1" of the child window as shown in FIG. 20 so as to replicate a file associated with the replication target along with the replication target, a picture in which the parent directory "directory 1" indicated by the directory structure information 221, "file 3" of the child window indicated by the directory structure information 222, and "file 1" (along with associated file relation information 231) which is associated with "file 3" are dragged as a replication target by the pointer 121 is displayed along with "directory 1-1" of the child window as shown in FIG. 21.

At this time, in order to clearly display the replication target in drag, as shown in FIG. 21, the information may be marked by a dotted line (or a translucent weak color).

Figure 22:
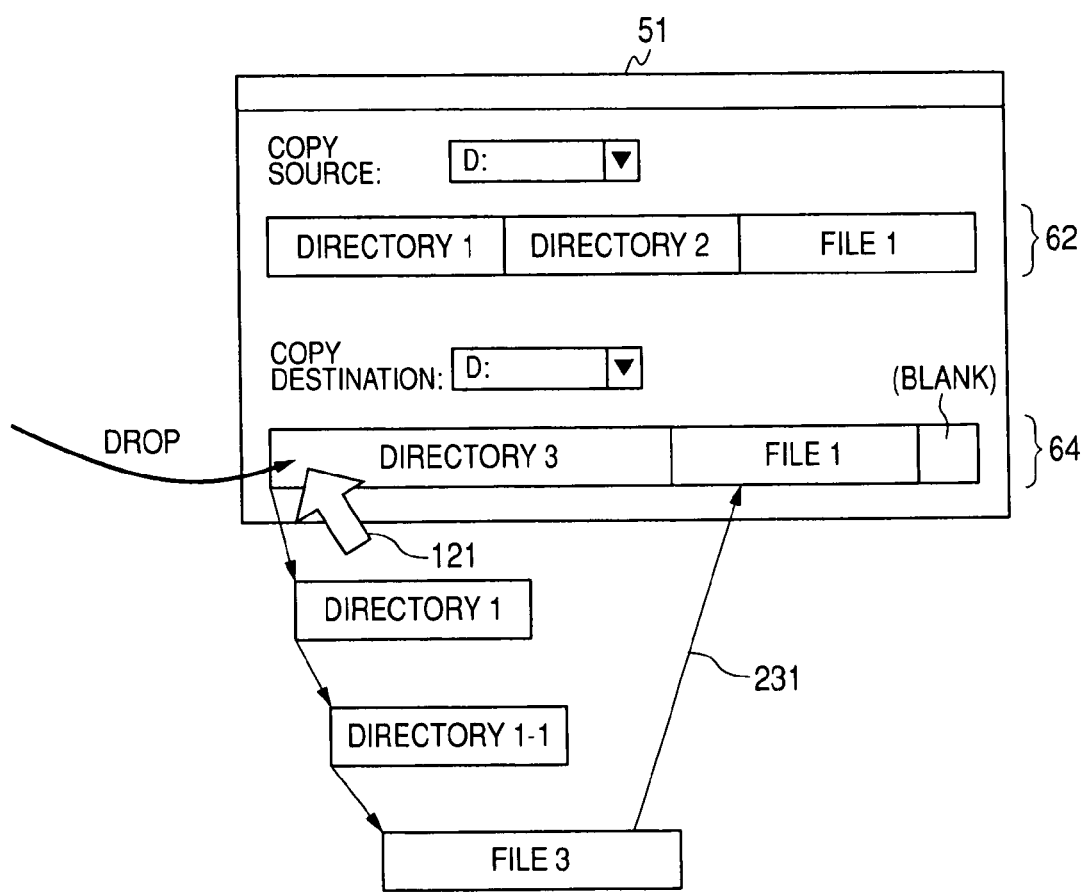
FIG. 22 is a view illustrating an example of a replication and edition command.

In this way, when the dragged replication target is dropped on the replication destination information display unit 64 as shown in FIG. 22, the dropped replication target constructs a directory structure as needed and is displayed on the replication destination information display unit 64. In the example shown in FIG. 22, the replication target is dropped on "directory 3", but the file "file 1" not associated with other files by the directory structure information is located outside "directory 3."

As described above, the user can easily replicate not only a file or directory designated by the user but also a file under the directory or a file associated therewith.

Although it has been described hitherto that the information management unit 31 inspects the directory structure or the associated file relation one by one, the directory structure or the associated file relation may be predetermined or information on a file may be managed by a specific file, for example, depending on the formats. In this case, the editing device 10 may perform the processes in accordance with such rules and thus the processes such as inspection of a directory structure or retrieval of associated files may be appropriately omitted.

Figure 23:
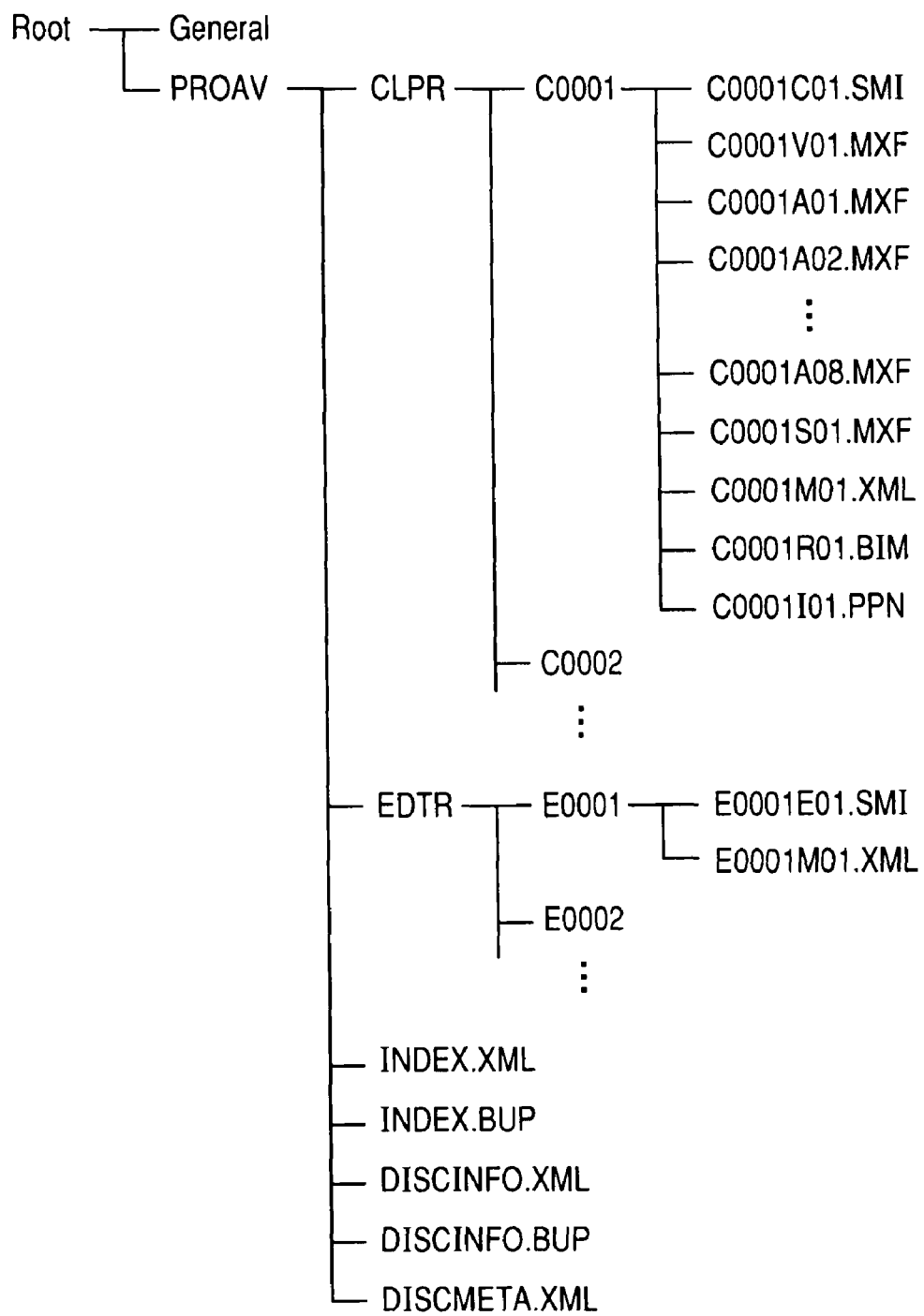
FIG. 23 is a view illustrating an example of a directory structure.

For example, FIG. 23 shows definition of a directory structure and a file defined by the file format used in "XDCAM (Registered Trademark of Sony Corporation)" which is an image preparing and editing system.

In the file format of "XDCAM", all the files are stored under a PROAC directory (PROAV). A General director (General) stores other files. In the PROAV directory (PROAV) are stored a clip root directory (CLPR) storing source data (contents data) of images or voices in the unit of clip (for example, photographing unit), an edit list root directory (EDTR) storing an edit list as edition information indicating an edition result using the source data of the clip in the unit of edition thereof, an index file (INDEX.XML) for managing the source data under the PROAV directory (PROAV) and a backup file (INDEX.BUP), a disc information file (DISCINFO.XML) for storing reproduction position information of the source data such as the clip and a backup file (DISCINFO.BUP), and a disc meta data file (DISCMETA.XML) for storing frame images (representative image) or label information representing the source data under the PROAV directory (PROAV).

In the clip root directory (CLPR), the source data such as "C0001" or "C0002" or the meta data thereof are collected and stored in the clip directory in the unit of clip. For example, the clip directory "C0001" is provided with a clip information file (C0001C01.SMI) which is a file for managing the clip, voice data files (C0001A01.MXF to C001A08.MXF) which are 8 files including the voice data of the channels of the clip, an image data file (C0001V01.MXF) which is a file including the image data of the clip, a low resolution data file (C0001S01.MXF) which is a file including sub-stream data (proxy data) of the clip, a non-real-time meta data file (C0001M01.XML) which is a file including clip meta data as meta data not requiring a real time property and corresponding to the source data of the clip, a real-time meta data file (C0001M01.BIM) which is a file including frame meta data as meta data requiring the real time property and corresponding to the source data of the clip, and a file with a picture pointer file (C0001I01.PPF) including a frame structure (for example, information on a compression format by pictures in MPEG or the like, or information such as offset address from the head of the file) of the image data file (C0001V01.MXF).

The other clip files such as "C0002" have the similar file structure.

In the edit list root directory (EDTR), the edit list such as "E0001" and "E0002" indicating an edition result of a clip or the meta data thereof are collected and stored in the edit list directory in the unit of edition. For example, the edit list directory "E0001" is provided with an edit list file (E0001E01.SMI) which is a file for managing the edition result (edit list) and an edit-list clip meta data file (E0001M01.XML) which is a file including clip meta data corresponding to the edited source data (part extracted as edited data from the source data of the entire clips used for the edition) or clip meta data newly generated on the basis of the clip meta data.

The other edit list files such as "E0002" have the similar file structure.

In the system of XDCAM, the directory structure is maintained. That is, the following features are extracted. First, data of each clip are collected in one directory for each clip. In other words, the entire files under "CXXXX" constitute one clip. Second, the data of each edit list are collected in one directory for each edition. In other words, the entire files under "EXXXX" constitute one edition.

Third, the index file (INDEX.XML) stores and manages a list indicating the entire files of each clip and the entire files of each edit list. That is, the index file (INDEX.XML) includes the entire files of each clip and files associated with the entire files of each edit list. Fourth, the reproduction position information of each clip is stored in the disc information file (DISCINFO.XML). That is, the disc information file (DISCINFO.XML) includes files associated with each clip directory (the entire files of each clip).

Fifth, the edit list file (E0001E01.SMI) stores information of the clip used for the edition. That is, the clip directory (the entire files of the clip used for the edition) of the clip used for the edition includes files associated with the edition list file (E0001E01.SMI).

With such a file format, the following restrictions exist at the time of replication.

First, the directory structure under the PROAV directory (PROAV) is necessarily maintained. Second, the replication of data under the clip root directory (CLPR) is performed necessarily in the unit of clip directory (every "CXXXX"). Similarly, the replication of data under the edit list root directory (EDTR) is performed necessarily in the unit of edit list directory (every "EXXXX").

Third, the clip (clip directory) used for the edition needs to be replicated at the time of replicating the data (edit list directory) under the edit list root directory (EDTR). Fourth, at the time of replicating the clip directory or the edit list directory, it is necessary to update the index file (INDEX.XML) of a replication destination and reflect the replication.

The replication of the index file (INDEX.XML) is inhibited and the updating process is carried out even if the replication thereof is performed. Accordingly, the current file structure (file structure of the clip or edit list) of the replication destination is reflected in the index file (INDEX.XML) of the replication destination. In addition, when the disc information file (DISCINFO.XML) is replicated, it can be defined that the reproduction position information (unnecessary reproduction position information) of a clip not existing in the replication destination is generated. However, the reproduction position information is not referred to and then is erased by the updating process of the disc information file (DISCINFO.XML) thereafter because it is not referred to. Accordingly, since the generation of the unnecessary reproduction position information has little influence, the matching process is not necessary.

Figure 24:
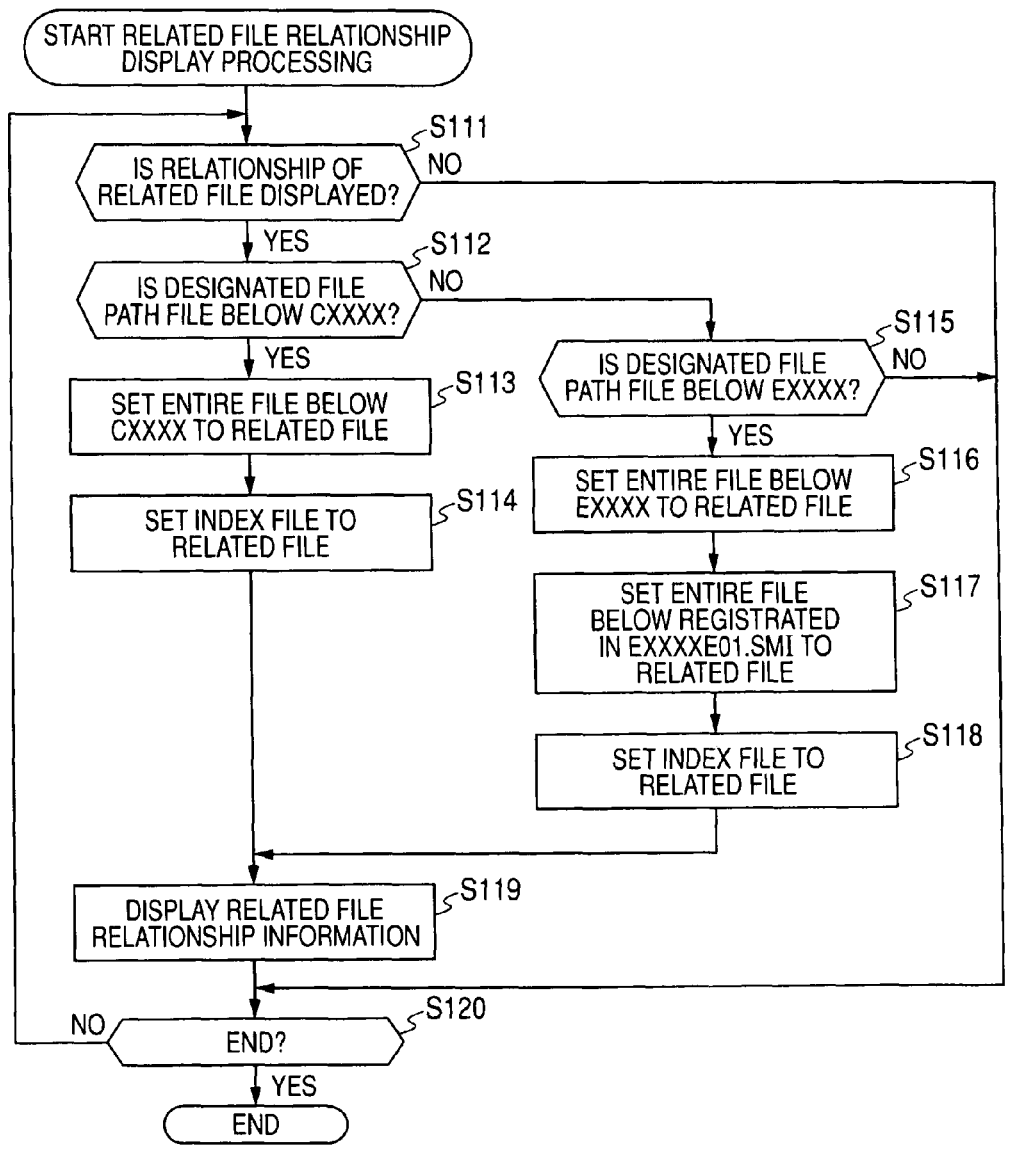
FIG. 24 is a flowchart illustrating another example of a flow of the associated file relation display process.

In the above-mentioned file format of XDCAM, the replication edition screen displaying process or the child window display control process is in the same way as being described with reference to the flowchart of FIG. 3 or 8. An example of the associated file relation display process in the file format of XDCAM is described with reference to the flowchart of FIG. 24.

In step S111, the GUI screen processing unit 41 judges whether the relation of associated files should be displayed on the basis of the user's instruction input through the input receiving unit 32. When it is judged that the relation should be displayed, the process of step S112 is performed. The associated file processing unit 44 judges whether the designated file is a file under the clip directory "CXXXX" with reference to the path of the designation file in step S112. When it is judged that the designated file is a file under the clip directory "CXXXX", the entire files under the clip directory "CXXXX" are defined as the associated files in step S113 and the index file (INDEX.XML) is defined as the associated file in step S114. When the process of S114 is finished, the associated file processing unit 44 performs the process of step S119.

When it is judged in step S112 that the designated file is not a file under the clip directory "CXXXX", the associated file processing unit 44 performs the process of step S115 and judges whether the designated file is a file under the edit list directory "EXXXX" with reference to the path of the designated file. When it is judged that the designated file is a file under the edit list directory "EXXXX", the associated file processing unit 44 proceeds the process to step S116 to define the entire files under the edit list directory "EXXXX" as the associated files in step S116, defines the entire files under the clip directory "CXXXX" registered in the edit list file (E0001E01.SMI) under the edit list directory "EXXXX" as the associated files in step S117, and defines the index file (INDEX.XML) as the associated file in step S118. When the process of step S118 is finished, the associated file processing unit 44 performs the process of step S119.

In step S119, the GUI screen processing unit 41 controls the display control unit 33 to display the associated file relation information on the display screen displayed on the display unit 13. When the process of step S119 is finished, the GUI screen processing unit 41 performs the process of step S120.

When it is judged in step S111 that the instruction is not accepted and the relation of the associated files is not displayed, the GUI screen processing unit 41 performs the process of step S120. When it is judged in step S115 that the designated file is not a file under the edit list directory "EXXXX", the associated file processing unit 44 performs the process of step S120.

The GUI screen processing unit 41 judges in step S120 whether the associated file relation display process is finished. When it is judged that the associated file relation display process is not finished, the GUI screen processing unit repeatedly performs the processes subsequent to step S111. When it is judged in step S120 that the associated file relation display process should be finished, for example, on the basis of the change of mode setting, the GUI screen processing unit 41 ends the associated file relation display process.

As described above, in a specific file format, the relation between files may be predetermined. In this case, the associated file processing unit 44 can easily define the associated files using the predetermined relation without retrieving the associated files.

Next, an example of the replication editing process in the file format of XDCAM is described with reference to the flowchart of FIGS. 25 to 27.

When the replication editing process is started, the GUI screen processing unit 41 controls the input receiving unit 32 in step S141 to judge whether the replication target (file or directory) is designated by the user through the input unit 12 and waits until it is judged that the replication target is designated.

When it is judged that the replication target is designated, the GUI screen processing unit 41 proceeds the process to step S142 to judge in step S142 whether the replication target exists under the clip root directory (CLPR) and performs the process of step S143 when it is judged that the replication target exists under the clip root directory. In step S143, the GUI screen processing unit 41 judges whether the replication target is the clip root directory (CLPR) itself and defines the entire files and the entire directories (that is, the entire clip) under the clip root directory (CLPR) as the replication target in step S144 when it is judged that the replication target is the clip root directory itself. When it is judged in step S143 that the replication target is not the clip root directory (CLPR) itself, the GUI screen processing unit 41 defines the entire files and the entire directories (that is, the entire clip) under the designated clip directory "CXXXX" as the replication target in step S145. When the process of step S144 or S145 is finished, the GUI screen processing unit 41 performs the process of step S161 of FIG. 26.

Figure 25:
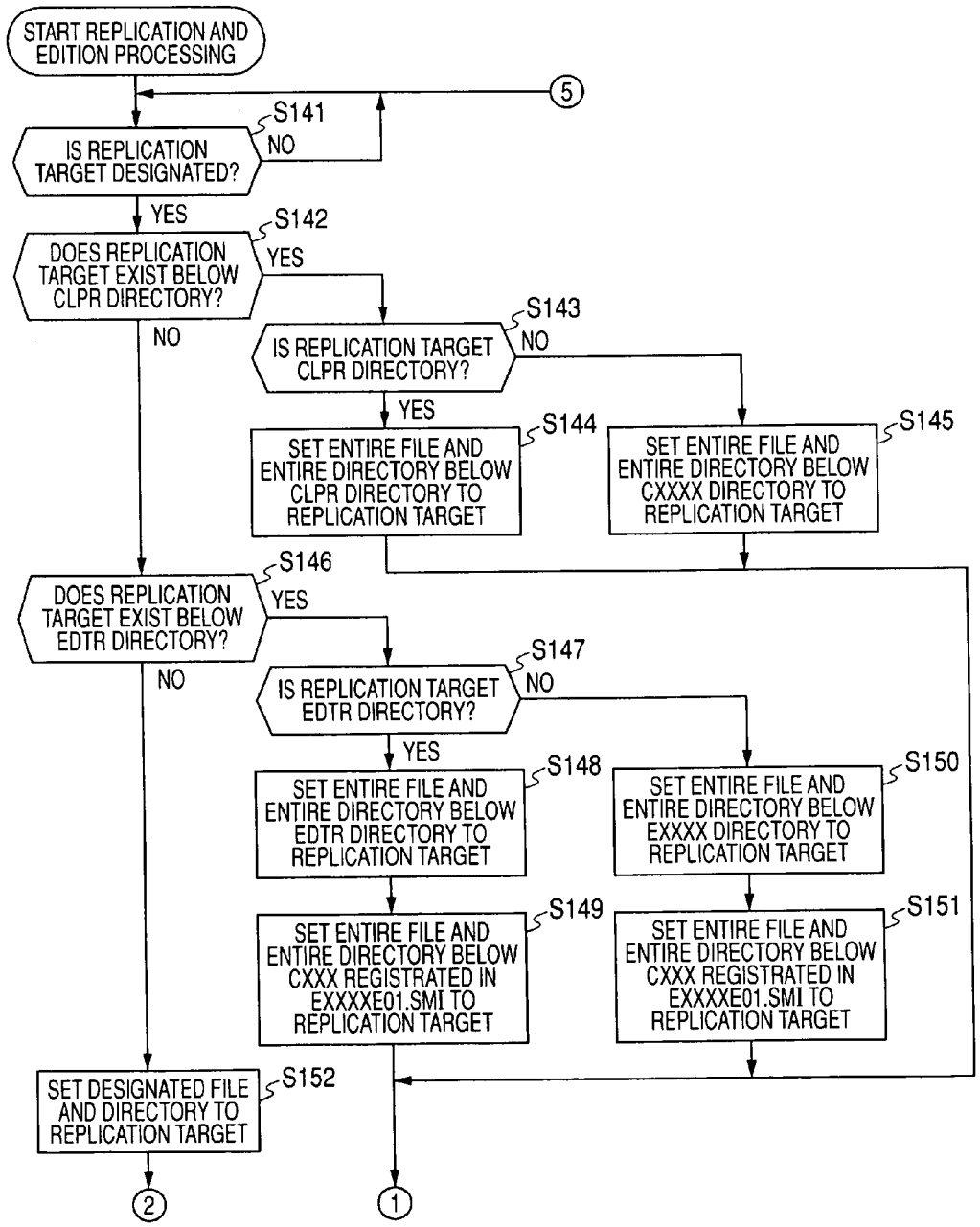
FIG. 25 is a flowchart illustrating another example of a flow of the replication and edition process.

When it is judged in step S142 of FIG. 25 that the replication target does not exist under the clip root directory (CLPR), the GUI screen processing unit 41 proceeds the process to S146 to judge whether the replication target exists under the edit list root directory (EDTR) and performs the process of step S147 when it is judged that the replication target exists under the edit list root directory. In step S147, the GUI screen processing unit 41 judges whether the replication target is the edit list root directory (EDTR) itself, defines the entire files and the entire directories (that is, the entire edit list) under the edit list root directory (EDTR) as the replication target in step S148 when it is judged that the replication target is the edit list root directory itself, and defines the entire files and the entire directories (that is, the entire clips registered in the entire edit list files (EXXXXE01.SMI)) under the clip directory registered in the entire edit list files (EXXXXE01.SMI) as the replication target in step S149.

When it is judged in step S147 that the replication target is not the edit list root directory (EDTR) itself, the GUI screen processing unit 41 defines the entire files and the entire directories (that is, the entire edit list) under the designated edit list directory (EXXXX) as the replication target in step S150 and defines the entire files and the entire directories (that is, the entire clips registered in the edit list files (EXXXXE01.SMI) of the designated edit list directory (EXXXX)) under the clip directory (CXXXX) registered in the edit list file (EXXXXE01.SMI) of the designated edit list directory (EXXXX) as the replication target in step S151.

Figure 26:
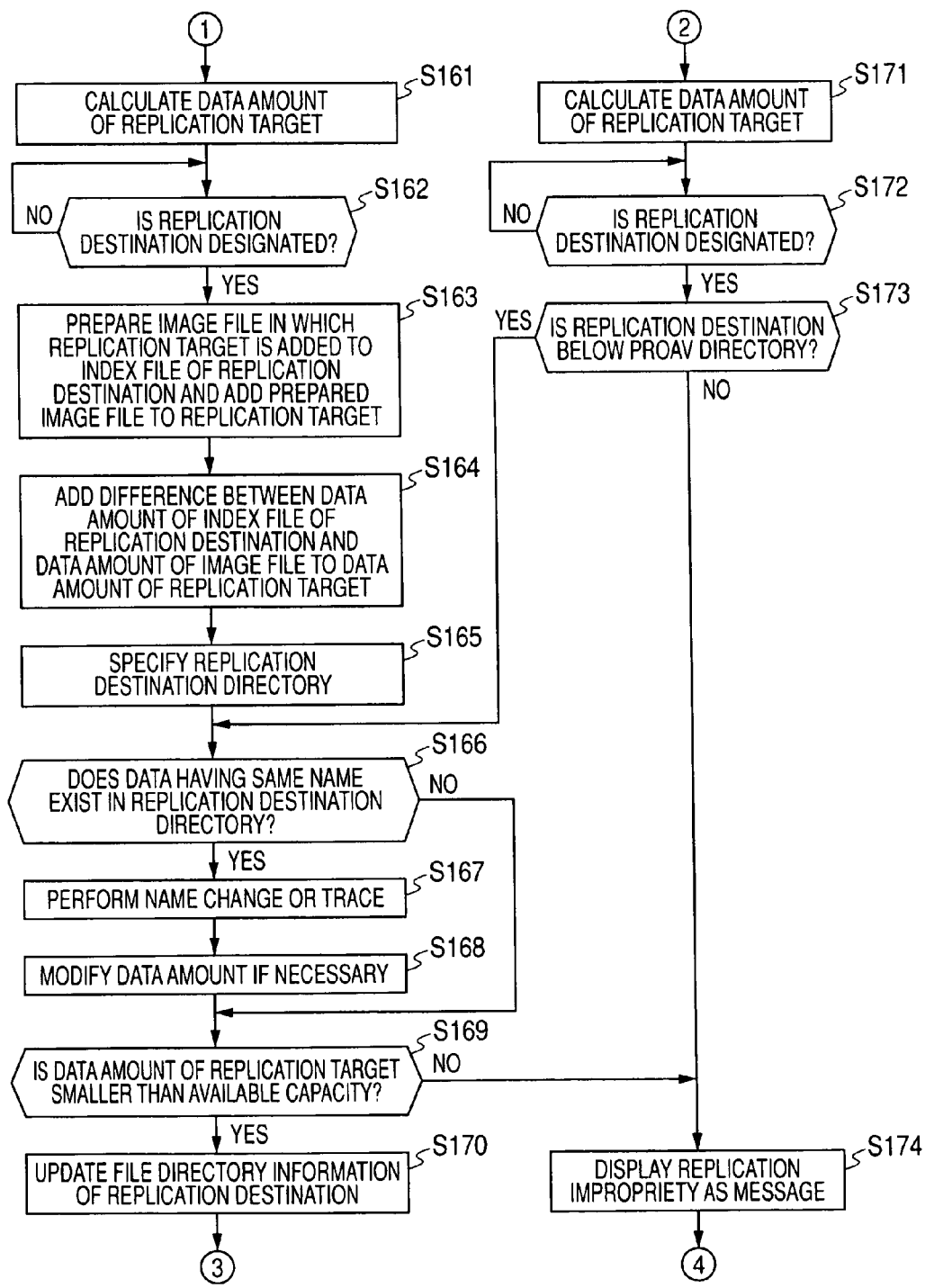
FIG. 26 is a flowchart illustrating another example of a flow of the replication and edition process, which is subsequent to FIG. 25.

When the process of step S149 or S151 is finished, the GUI screen processing unit 41 performs the process of step S161 of FIG. 26.

When it is judged in step S146 of FIG. 25 that the replication target does not exist under the edit list root directory (EDTR), the GUI screen processing unit 41 proceeds the process to step S152 to define the designated file or directory as the replication target. When the replication target is determined, the GUI screen processing unit 41 performs the process of step S171 of FIG. 26.

When the process of step S144, S145, S149, or S151 of FIG. 25 is finished, the file directory information processing unit 42 reads out information of the replication target from the replication source recording medium 21 and calculates the data amount of the replication target in step S161 of FIG. 26.

In step S162, the GUI screen processing unit 41 judges whether the replication destination is designated and waits until it is judged that the replication destination is designated. For example, when it is judged that the replication destination is designated by the user, the GUI screen processing unit 41 performs the process of step S163. In step S163, the file directory information processing unit 42 prepares an image file (that is, replicated state) in which information of the replication target (file or directory) is added to the index file (INDEX.XML) of the replication destination and adds the image file to the replication target. Then, in step S164, the file directory information processing unit adds a difference between the data amount of the index file of the replication destination and the data amount of the image file to the data amount of the replication target.

The GUI screen processing unit 41 specifies the entire replication destination directories of the replication target in step S165, judges in step S166 whether data having the same name exists in the replication destination directory, and performs the process of step S167 when it is judged that the data having the same name exists in the replication destination directory. The GUI screen processing unit 41 changes or overwrites the name in step S167 and corrects the data amount as needed in step S168. When the process of step S168 is finished, the GUI screen processing unit 41 performs the process of step S169. When it is judged in step S166 that the data having the same name does not exist in the replication destination directory, the GUI screen processing unit 41 performs the process of step S169.

The GUI screen processing unit 41 judges in step S169 whether the data amount of the replication target is smaller than the available capacity of the drive of the replication destination and performs the process of step S170 when it is judged that the data amount of the replication target is smaller than the available capacity. The file directory information processing unit 42 updates the file directory information of the replication destination displayed on the replication destination information display unit 64 etc. in step S170 and then performs the process of step S181 of FIG. 27.

When the process of step S152 of FIG. 25 is finished, the file directory information processing unit 42 reads out the information of the replication target from the destination source recording medium 21 and calculates the data amount of the replication target in step S171 of FIG. 26.

In step S172, the GUI screen processing unit 41 judges whether the replication destination is designated and waits until it is judged that the replication destination is designated. For example, when it is judged that the replication destination is designated by the user, the GUI screen processing unit 41 proceeds the process to step S173 to judge in step S173 whether the designated replication destination is under the PROAV directory (PROAV). When it is judged that the designated replication destination is under the PROAV directory (PROAV), the GUI screen processing unit returns the process to step S165 to perform the processes subsequent to step S165 on the designated replication target.

When it is judged in step S173 that the replication destination is not under the PROAV directory (PROAV), the GUI screen processing unit 41 performs the process of step S174.

When it is judged in step S169 that the data amount of the replication target is greater than the available capacity, the GUI screen processing unit 41 performs the process of step S174.

In step S174, the GUI screen processing unit 41 controls the display control unit 33 to display a replication inhibition message for informing the user of the replication inhibition on the display unit 13. When the process of step S174 is finished, the GUI screen processing unit 41 finishes the replication editing process.

Figure 27:
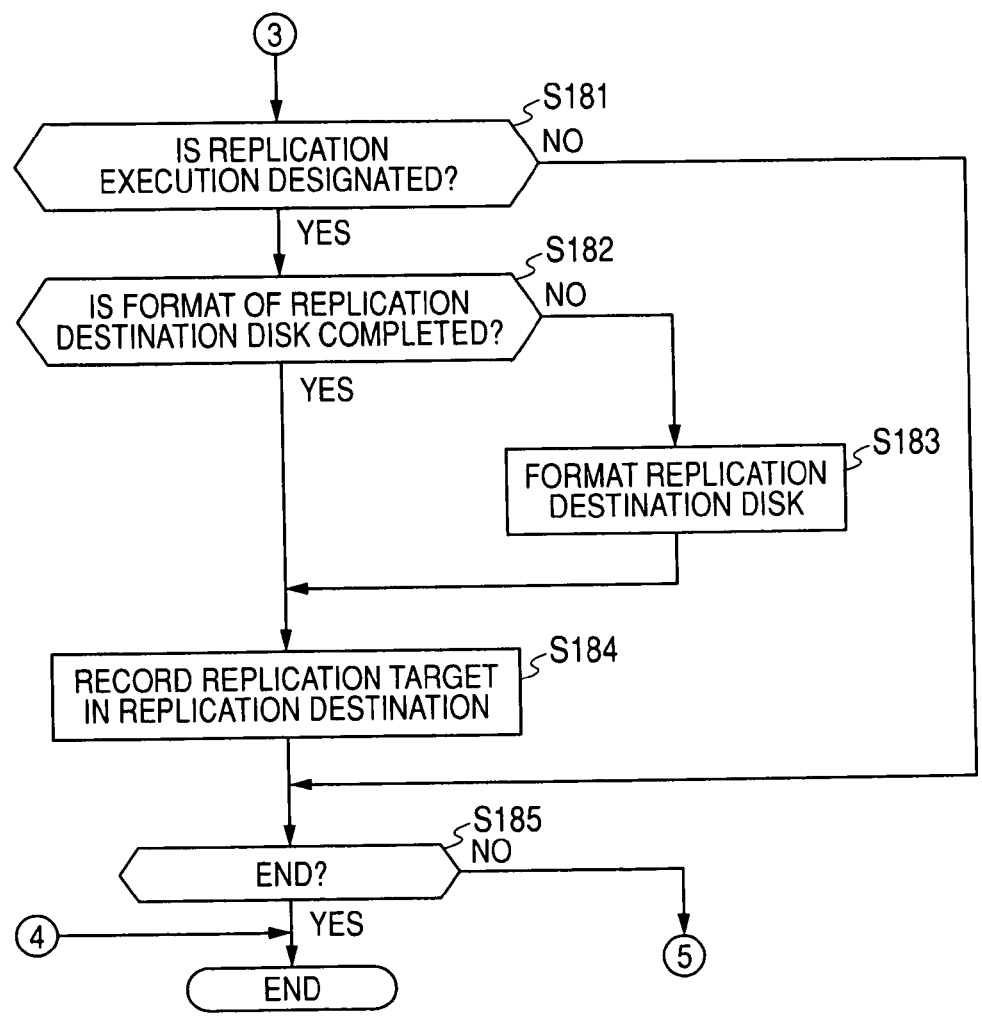
FIG. 27 is a flowchart illustrating another example of a flow of the replication and edition process, which is subsequent to FIG. 26.

In step S181 of FIG. 27, the GUI screen processing unit 41 controls the input receiving unit 32 to judge whether the execution of the replication is instructed, and performs the process of step S182 when it is judged that the execution of the replication is instructed by the user's operation of the replication executing button 65 or the like.

The replication executing unit 34 judges in step S182 whether the replication destination disc is completely formatted. When it is judged that the replication destination disc is not formatted, the replication executing unit 34 formats the replication destination disc in step S183, constructs the directory structure shown in FIG. 23, and then performs the process of step S184.

Figure 28:
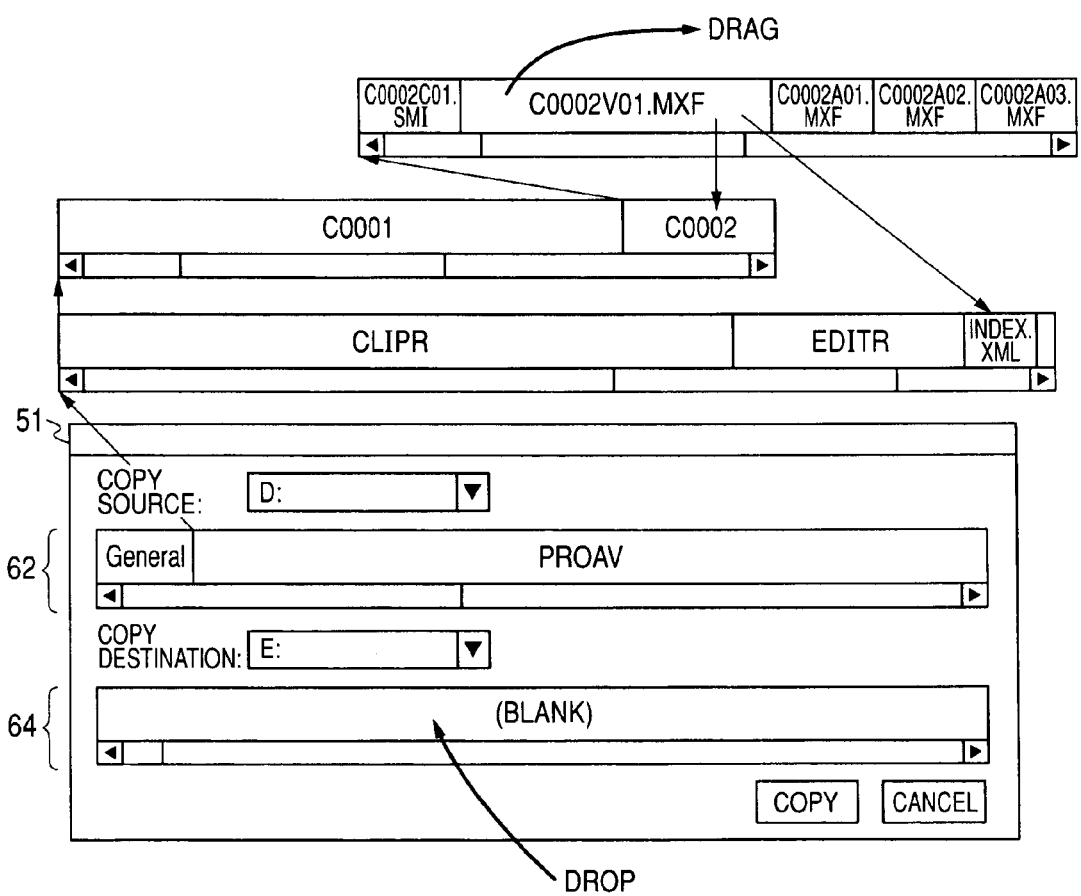
FIG. 28 is a view illustrating an example of a format at the time of replication.
Figure 29:
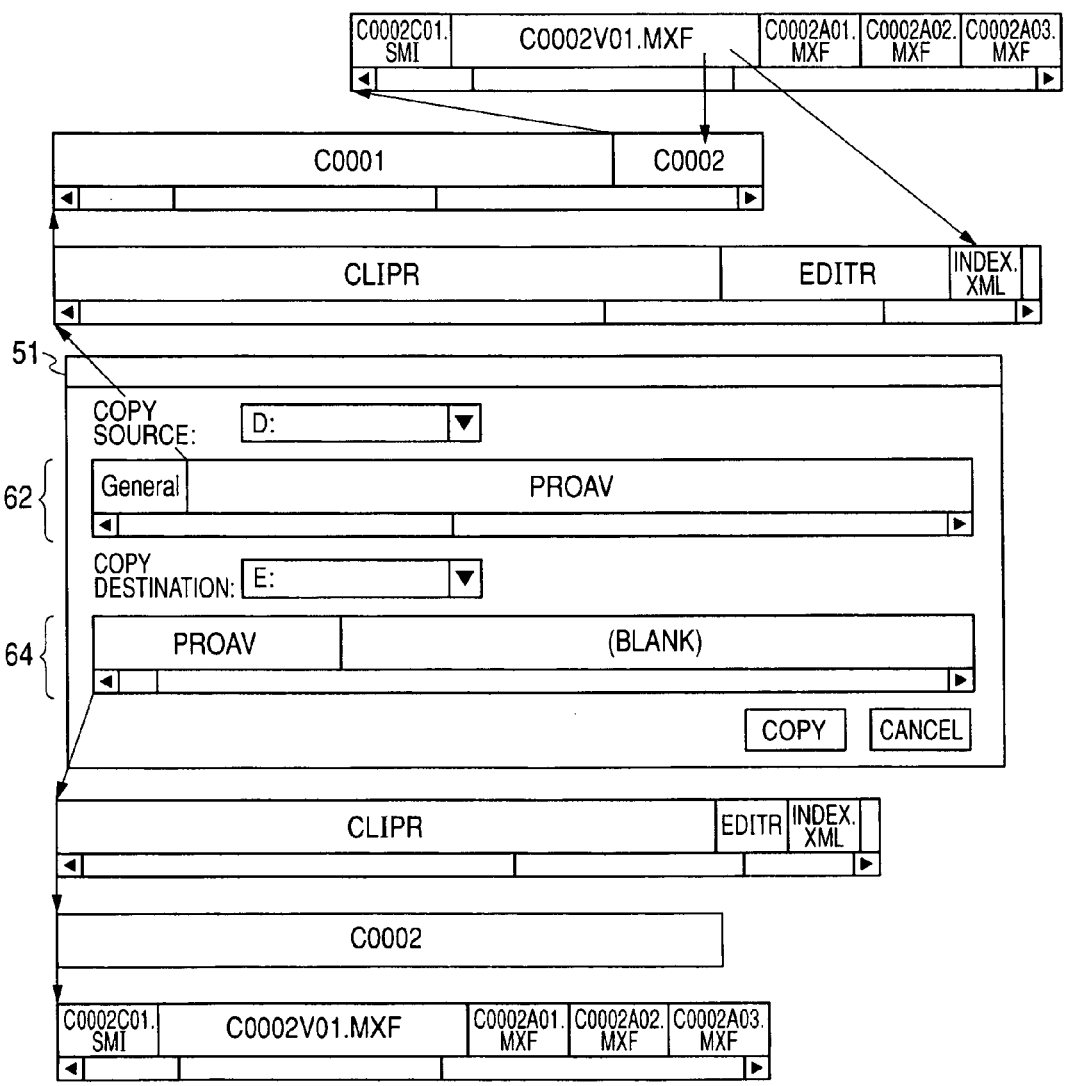
FIG. 29 is a view illustrating an example of the format at the time of replication, which is subsequent to FIG. 28.

For example, as shown in FIG. 28, when the user drags and drops the clip file (C0002V01.MXF) as the replication target to an empty area, the replication executing unit 34 constructs a predetermined directory structure (under the PROAV directory) by performing the formatting process and replicates the clip file (C0002V01.MXF) as the replication target in a correct directory (under the clip directory "C0002").

When determining that the replication destination disc is formatted and the directory structure shown in FIG. 23 is constructed in Step S182, the replication executing unit 34 proceeds the process to step S184.

The replication executing unit 34 records the replication target in the replication destination in Sep S184 and proceeds the process to Step S185. When determining that the replication execution is not commanded in Step S181, the GUI screen processing unit 41 proceeds the process to Step S185.

The GUI screen processing unit 41 determines whether or not the replication and edition process is ended in Step S185. When determining that the replication and edition process is not ended, the GUI screen processing unit 41 returns the process to Step S141 shown in FIG. 25 and repeats the process thereafter. When determining that the replication and edition process is ended in Sep S185 shown in FIG. 27, the GUI screen processing unit 41 ends up the replication and edition process.

As described above, the editing device 10 performs the replication and edition process. Accordingly, even when there is a restriction in replication of the files or the directories as described above, the user can easily perform the edition work. That is, the editing device 10 can improve the convenience in replication work.

Since the related file required for the file to be replicated is searched and is automatically replicated, the user can perform more secure replication work operation while suppressing a designation omission from occurring without complicated works such as verification of a relationship between the files one by one to designate and replicate a required file.

In the above description, the replication source recording medium 21 and the replication destination recording medium 22 is described as physically different recording mediums (removable media mounted in different drives), but it is not limited to the configuration. For example, the editing device 10 may permit the replication operation between the removable media to be performed or permit the replication of the file or the directory on a same recording medium by an on-the-fly mode of writing and reading processes to be performed by using only one drive.

The number of the replication source recording media 21 and the number of the replication destination recording media 22 do not matter. For example, the files or the directories may be replicated from a plurality of replication source recording media to one replication destination recording medium by one-time replication process and the files or the directories may be replicated from one replication source recording medium to a plurality of replication destination recording media. The files or the directories may be replicated from the plurality of replication source recording media to the plurality of replication destination recording media by the one-time replication process. In that case, the processes for the respective replication and edition are the same as those described above.

In the above description, the replication of the image data or the sound data is described, but all contents and types of the replicated data may be used.

In the above description, in the editing device 10, the file directory information such as the replication source information or the replication destination information may be expressed in the bar graph. However, when the directory information is expressed in the figure so that the user can intuitively know the data amounts of the directories only with eyes, all display methods maybe used similar to the data amount. For example, the data amount may be expressed in an arbitrary parameter such as size, area, height, color, and density. For example, the data amounts may be expressed in a circular graph.

The processes described above may be executed by hardware and may be executed by software. In this case, for example, the editing device 10 may be formed of a personal computer shown in FIG. 30.

Figure 30:
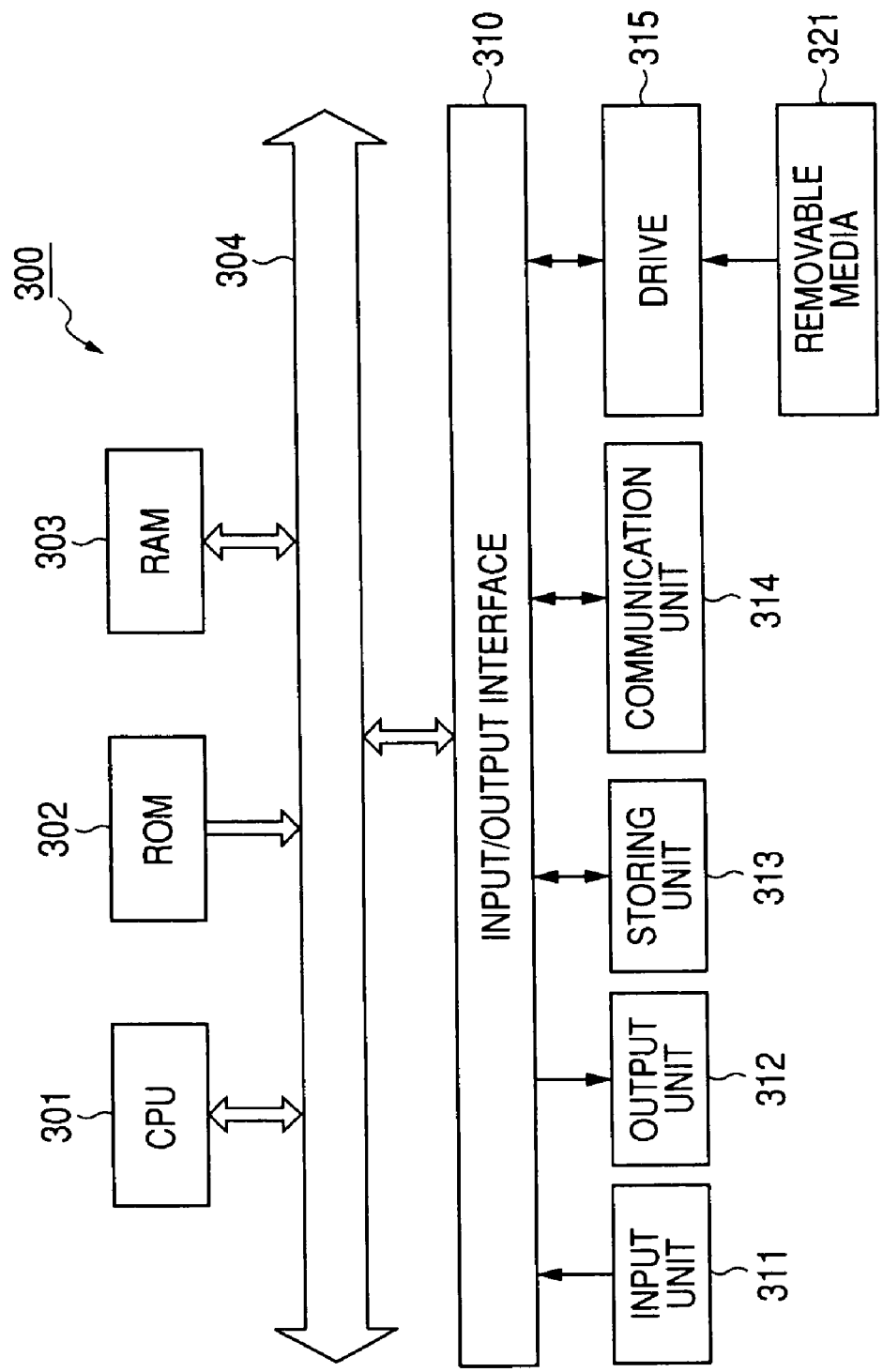
FIG. 30 is a block diagram illustrating a configuration of a personal computer to which the invention is applied.

In FIG. 30, a CPU 301 (Central Processing Unit) of a personal computer 300 executes various processes depending on a program stored in a ROM (Read Only Memory) 302 or a program loaded from the storage unit 313 to a RAM (Random Access Memory) 303. Data which the CPU 301 requires to execute the various processes are properly stored in the RAM 303.

The CPU 301, ROM 302, and RAM 303 are connected to each other via a bus 304. An input/output interface 310 is also connected to the bus 304.

An input unit 311 formed of a keyboard and a mouse, a display formed of a CRT (Cathode Ray Tube) and an LCD (Liquid Crystal Display), an output unit 312 formed of a speaker, a storage unit 313 formed of a hard disc, and a communication unit 314 formed of a modem are connected to the input/output interface 310. The communication unit 314 performs a communication process via a network including Internet.

A drive 315 is connected to the input/output interface 310 if necessary. Removable media 321 such as a magnetic disc, an optical disc, a magneto-optical disc, or a semiconductor memory are properly mounted on the input/output interface 310 and computer programs read therefrom are installed in the storage unit 13 if necessary.

When the processes described above are executed by software, a program constituting the software is installed from the network or the recording medium.

For example, as shown in FIG. 30, the recording medium is formed of the removable media 321 such as a magnetic disc (including a flexible disc), an optical disc (including a CD-ROM (Compact Disc-Read Only Memory) and a DVD (Digital Versatile Disc)), an magneto-optical disc (including an MD (Mini-Disc) (registered trademark)), or a semiconductor memory, in which the program is recorded and which are distributed to deliver the program the user aside from a main body of a device, or the ROM 302 or the hard disc involved in the storage unit 313, where the program is recorded and which are previously mounted on the main body of the device and delivered to the user.

In the specification, a step of describing the program recorded in the recording medium includes a process performed in temporal sequence according to the order described therein and a process parallely or separatively performed even though the process is not necessarily performed in temporal sequence.

In the specification, a system represents an entire device formed of a plurality of units.

A constituent part described as one device in the description above is partitioned and may be formed of a plurality of devices. On the contrary, the constituent parts described as the plurality of devices in the description are assembled and may be formed of one device. Constituent parts other than the constituent parts of the devices described above may be added. As long as the configuration or operation as the entire system is substantially the same, the configuration of one device may include a part of the configuration of the other device. That is, an embodiment of the invention is not limited to the embodiments described above and various modifications may occur within the scope of the gist of the invention.

The invention may be applied to a replication and edition device.

It should be understood by those skilled in the art that various modifications, combinations, sub-combinations, and alternations may occur depending on design requirements and other factors insofar as they are within the scope of the appended claims or the equivalents thereof.

What is claimed is:

1. An information processing apparatus for replicating and editing data, the information processing apparatus comprising:
    a replication destination information display controlling unit displaying files and directories of a recording medium as a replication destination of the data in the figure on a display unit so that a user can intuitively know respective data amount of each of the files and directories of the recording medium and an available capacity of the recording medium as replication destination information;
    a replication unit executing planned replication and edition on the basis of the replication destination information displayed by the replication destination information display controlling unit; and
    an input receiving unit receiving a replication and edition command input inputted by the user's dragging and dropping operation on an icon or a figure of a file or a directory to be replicated to the replication destination information displayed by the replication destination information display controlling unit,
    wherein the replication destination information display controlling unit displays directory structure information related to the file or the directory to be replicated during the user's dragging and dropping operation.

2. The information processing apparatus according to claim 1, wherein the replication destination information display controlling unit displays the replication destination information in the form of a bar graph expressing data amounts of the files, the directories, and the available capacity in length on the display unit.

3. The information processing apparatus according to claim 1, further comprising a data amount calculating unit calculating the data amounts of the directories by calculating the sum of the data amounts of the files stored under the directories.

4. The information processing apparatus according to claim 1, further comprising a child window preparing unit preparing a child window for displaying directories and the files stored under the directories displayed by the replication destination information display controlling unit in the figure so that the user can intuitively know the data amount and displaying the child window on the display unit.

5. The information processing apparatus according to claim 4, further comprising a directory structure information preparing unit preparing directory structure information displaying a relationship between the child window prepared and displayed by the child window preparing unit and a parent directory corresponding to the child window and displaying the directory structure information on the display unit.

6. The information processing apparatus according to claim 1, further comprising a related file relationship information preparing unit preparing related file relationship information displaying a relationship between the file displayed by the replication destination information display controlling unit and a file related to the file and displaying the related file relationship information on the display unit.

7. The information processing apparatus according to claim 1,
    wherein the replication destination information display controlling unit displays the dragged and dropped file or directory to be replicated in the figure on the display unit so that the user can intuitively know the data amount in the replication and command input received by the input receiving unit.

8. The information processing apparatus according to claim 1, further comprising a replication source information display controlling unit displaying in the figure the data amounts of the files and the directories of a recording medium and an available capacity of the recording medium as the data replication source on the display unit so that the user can intuitively know them as the replication source information.

9. An information processing method for an information processing apparatus for replicating and editing data, the method comprising the steps of:
    displaying in the figure the file and the directory of the recording medium as the replication destination of the data on a display unit so that the user can intuitively know respective data amount of each of the files and the directories and the available capacity of the recording medium as the replication destination, utilizing a replication destination information display controlling unit;
    executing planned replication and edition on the basis of the replication destination information displayed on the display unit, utilizing a replication unit;
    receiving a replication and edition command input inputted by the user's dragging and dropping operation on an icon or a figure of a file or a directory to be replicated to the replication destination information displayed by the replication destination information display controlling unit; and
    displaying directory structure information related to the file or the directory to be replicated during the user's dragging and dropping operation.

10. A computer-readable medium storing a computer program that when executed on a computer causes data replication edition processes, the program comprising the steps of:

displaying in the figure the file and the directory of the recording medium as the replication destination of the data on a display unit so that the user can intuitively know respective data amount of each of the files and the directories and the available capacity of the recording medium as the replication destination information;

executing planned replication and edition on the basis of the replication destination information displayed on the display unit;

receiving a replication and edition command input inputted by the user's dragging and dropping operation on an icon or a figure of a file or a directory to be replicated to the replication destination information displayed by the replication destination information display controlling unit; and displaying directory structure information related to the file or the directory to be replicated during the user's dragging and dropping operation.

* * * * *